US012583724B2

(12) United States Patent
Jinno et al.

(10) Patent No.: US 12,583,724 B2
(45) Date of Patent: Mar. 24, 2026

(54) CAP OPENING AND CLOSING APPARATUS AND METHOD OF CONTROLLING SAME

(71) Applicant: Educational Foundation of Kokushikan, Tokyo (JP)

(72) Inventors: Makoto Jinno, Tokyo (JP); Ryosuke Nonoyama, Tokyo (JP)

(73) Assignee: Educational Foundation of Kokushikan, Tokyo (JP)

( * ) Notice: Subject to any disclaimer, the term of this patent is extended or adjusted under 35 U.S.C. 154(b) by 391 days.

(21) Appl. No.: 18/142,793

(22) Filed: May 3, 2023

(65) Prior Publication Data

US 2023/0373772 A1 Nov. 23, 2023

(30) Foreign Application Priority Data

May 23, 2022 (JP) ................................ 2022-083972
Oct. 31, 2022 (JP) ................................ 2022-174960

(51) Int. Cl.
*B67B 7/14* (2006.01)
*B67B 3/26* (2006.01)

(52) U.S. Cl.
CPC . *B67B 7/14* (2013.01); *B67B 3/26* (2013.01)

(58) Field of Classification Search
CPC ........ B01L 3/50825; G01N 2035/0405; B67B 3/26; B67B 3/22; B67B 6/00; B67B 3/28; B67B 7/14; B67B 7/12; B67B 7/02; B67B 7/00
USPC ....................................... 81/3.29, 3.37, 3.36
See application file for complete search history.

(56) References Cited

U.S. PATENT DOCUMENTS 5,628,962 A * 5/1997 Kanbara ................ G01N 35/04 222/549
8,297,151 B1 * 10/2012 Huppenthal .............. B67B 7/14 81/3.36
8,703,056 B2 * 4/2014 Sakairi ................ G01N 35/025 422/65
9,052,299 B2 * 6/2015 Jones .................... G01N 35/04
11,572,263 B2 2/2023 Lee
2014/0102239 A1 * 4/2014 Umeno .................. B25J 9/0087 294/213

FOREIGN PATENT DOCUMENTS

JP 2019-527339 A 9/2019

* cited by examiner

*Primary Examiner* — Tom Rodgers
(74) *Attorney, Agent, or Firm* — WHDA, LLP

(57) ABSTRACT

A cap opening and closing apparatus comprises: a first arm including a catch portion that moves, engages with an edge portion of a cap of a microtube, and opens the cap as the first arm rotates about a first rotation axis in a first direction; and a second arm including a pressing member that presses and closes the cap as the second arm rotates about a second rotation axis in a second direction opposite to the first direction. When opening the cap, the first and second arms are rotated in the first direction while the cap is positioned between the catch portion and the pressure member and an angle formed by a line joining the first rotation axis and the catch portion and a line joining the second rotation axis and the pressing member is kept within a predetermined angle range.

17 Claims, 15 Drawing Sheets

FIG. 3A
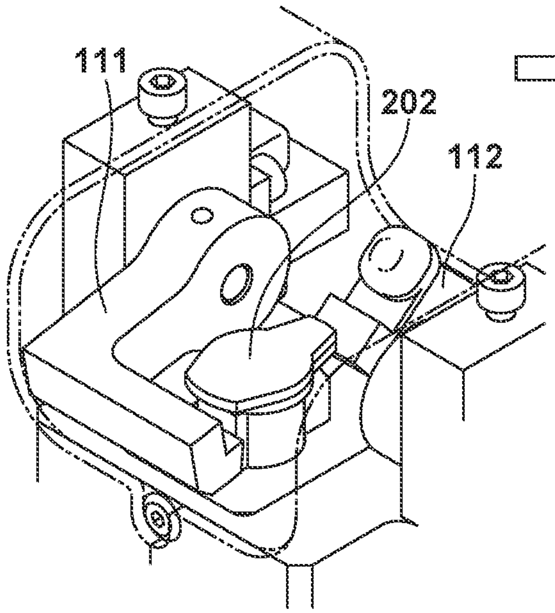
FIG. 3B
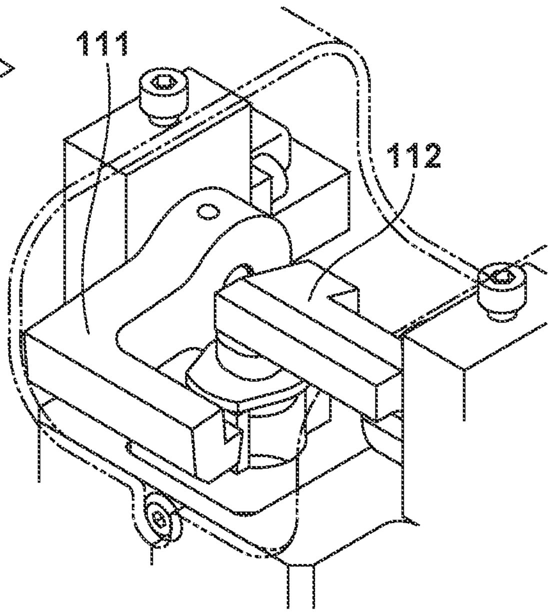
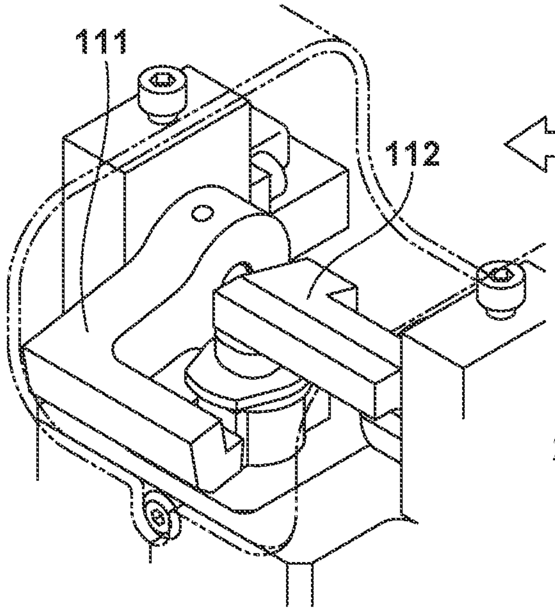
FIG. 3D
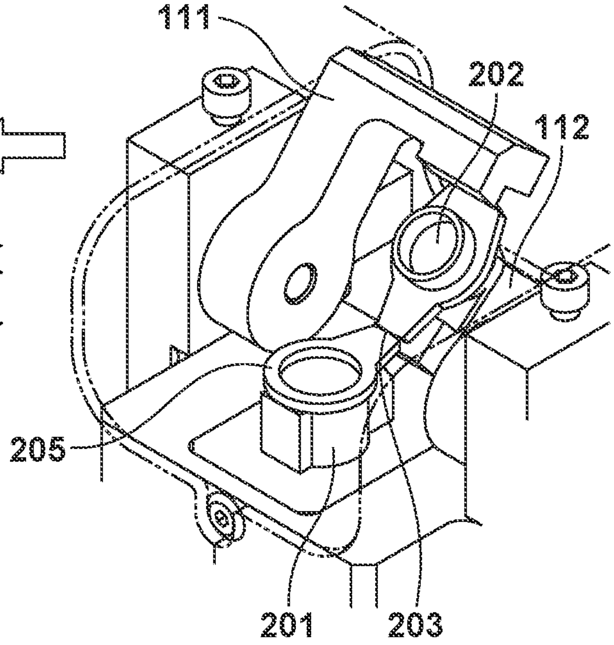
FIG. 3C

FIG. 9A
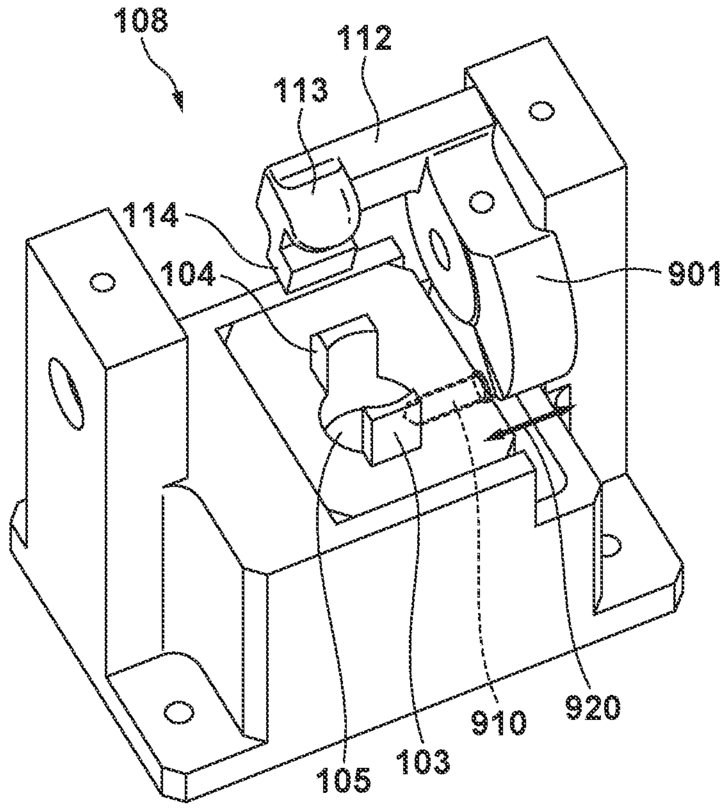
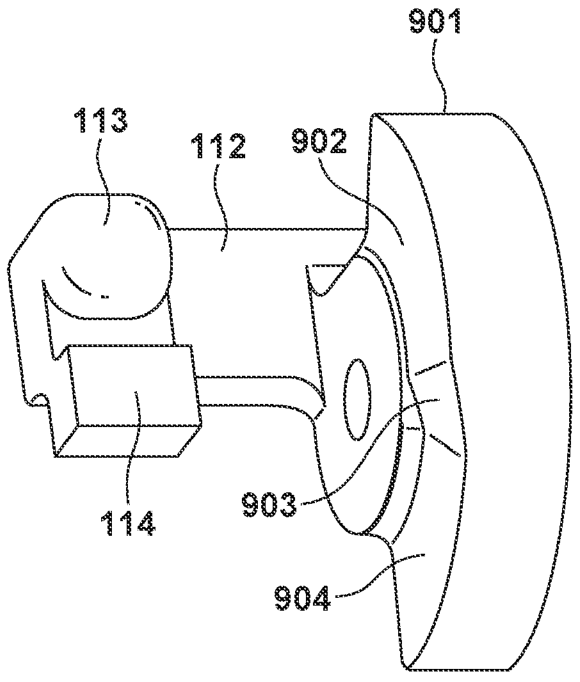
FIG. 9B
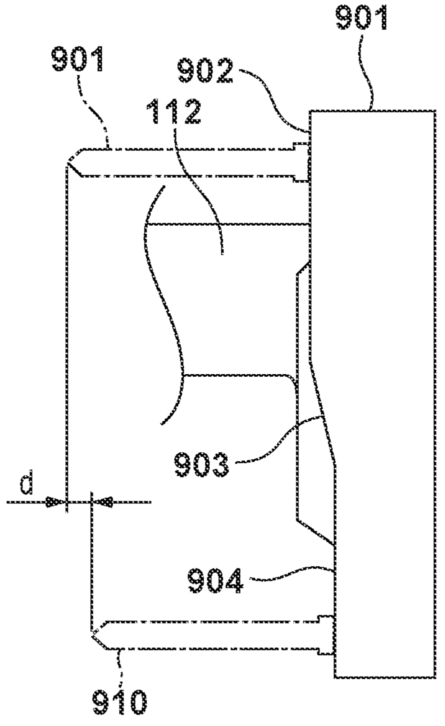
FIG. 9C

CAP OPENING AND CLOSING APPARATUS AND METHOD OF CONTROLLING SAME

CROSS-REFERENCE TO RELATED APPLICATION(S)

This application claims priority to and the benefit of Japanese Patent Application No. 2022-083972, filed May 23, 2022, and Japanese Patent Application No. 2022-174960, filed Oct. 31, 2022, the entire disclosures of which are incorporated herein by reference.

BACKGROUND OF THE INVENTION

Field of the Invention

The present invention relates to a cap opening and closing apparatus and a method of controlling the same.

Description of the Related Art automation of systems for conducting a PCR test and the like in response to the novel coronavirus (COVID-19) and other future virus variants and unknown viruses has become indispensable. The procedure of a PCR test and the like includes using various containers, such as centrifuge tubes, cryopreservation tubes, and microtubes, to hold various types of samples, such as saliva and nasopharyngeal fluid. The automation of the opening and closing of containers is important in the automation and the optimization of testing systems.

In Japanese Patent Laid-Open No. 2019-527339 (hereinafter referred to as Patent Document 1), a mechanism is described for opening and closing a cap of a microtube such as that illustrated in FIGS. 7A to 7C. According to this apparatus, the cap of the microtube is opened and closed by an opening and closing portion (710) being slid to insert a cap tip of the microtube into the space of a fastening portion (750) and the opening and closing portion (710) being rotated in this state.

Centrifuge tubes, cryopreservation tubes, microtubes, and similar sample containers are sold by various physicochemical product manufacturers, and a large quantity of such sample containers are used at PCR testing facilities and the like. With microtubes of the same capacity, the dimensions of the external shape (diameter, length) of the container are largely the same. However, depending on the maker, the shape and dimensions of the cap are slightly different, with the different companies being differentiated by the ease of use and sealing properties. Cap opening and closing automation is easy in the case all of microtubes used being the same. However, using the microtubes of a specific manufacturer leaves open the possibility of disastrously being unable to performing testing when microtubes become difficult to procure from the manufacturer. Also, completely standardizing the shape of microtubes so that each company provides the same microtube is also not easy. Thus, it is important to build an automated system that can handle microtubes from various manufacturers.

The handling operations for microtubes include handling of sample containers, capping and uncapping sample containers, requested operations (a dispensing operation, an agitating operation, a centrifugal operation, and the like), and the like. As described above, since caps come in various shapes, automation of the capping and uncapping operation is an important element in realizing a technique for automating and optimizing a testing system. When a multi-axis robot (manipulator) is used in the uncapping and capping operation of microtubes, the large actions of the robot create issues pertaining to operation range, work time, and the like.

Also, Patent Document 1 describes an apparatus designed to specialize in opening and closing a cap of a microtube and simultaneously open and close caps of a plurality of microtubes. No mention is given to accommodating to changes in the microtube cap shape. For example, in Patent Document 1, the cap is opened by the tip portion of the cap being latched onto from the upper side of the cap. However, since the gap (the width in the height direction of the fastening portion (750)) of the latching portion is limited, the caps that can be opened and closed are limited in terms of the thickness of the tip of the cap by the size of the gap of the fastening portion (750).

The present invention realizes a cap opening and closing mechanism that accommodates caps of microtubes of various shapes.

SUMMARY OF THE INVENTION

According to one aspect of the present invention, there is provided a cap opening and closing apparatus for opening and closing a cap of microtube including a container body and the cap connected to the container body via a hinge portion, comprising: a first arm that rotates about a first rotation axis, the first arm including a catch portion that moves, engages with an edge portion of the cap of the microtube placed at a predetermined position, and opens the cap as the first arm rotates in a first direction; a second arm that rotates about a second rotation axis, the second arm including a pressing member that presses and closes the cap of the microtube placed at the predetermined position as the second arm rotates in a second direction opposite to the first direction; and a control unit that opens the cap by rotating the first arm and the second arm in the first direction with the cap positioned between the catch portion and the pressing member and with a specific rotational position relationship maintained in which an angle formed by a first straight line joining the first rotation axis and the catch portion and a second straight line joining the second rotation axis and the pressing member is within a predetermined angle range.

BRIEF DESCRIPTION OF THE DRAWINGS

FIGS. 3A to 3D are diagrams for describing a cap opening and closing operation according to the first embodiment.

FIGS. 9A to 9C are diagrams for describing the structure of a capping arm and a pin for fixing a microtube according to a third embodiment.

DESCRIPTION OF THE EMBODIMENTS

Figure 1A:
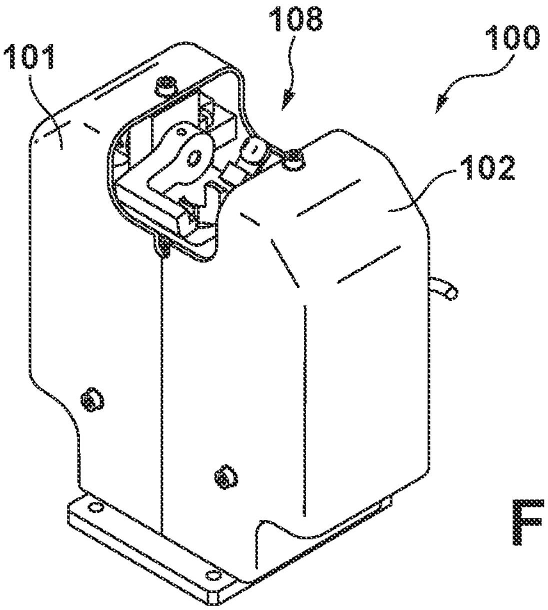
FIGS. 1A and 1B are general views of a cap opening and closing apparatus according to a first embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Figure 1B:
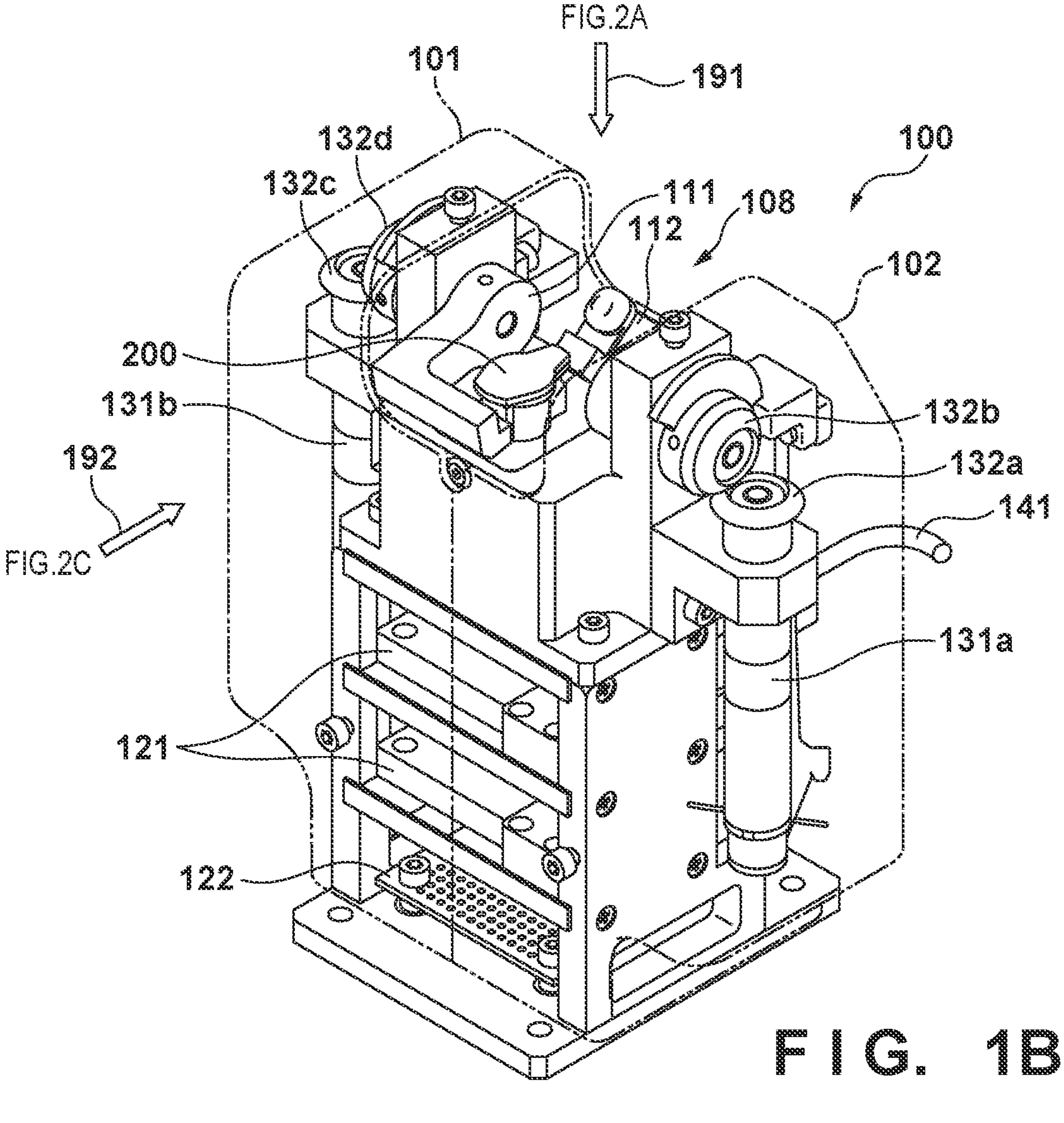

FIGS. 1A and 1B are general views of a cap opening and closing apparatus 100 according to the embodiment. FIG. 1A is an appearance view of the cap opening and closing apparatus 100 with an outer cover installed. FIG. 1B is a diagram illustrating the internal structure of the cap opening and closing apparatus 100. A control unit 121, a circuit board 122 communicatively connected to a higher level controller, a DC servo motor 131, and the like are housed in outer covers 101 and 102. The control unit 121 performs various types of control including drive control of the DC servo motor 131 according to instructions from the higher level controller (not illustrated). For example, the control unit 121 controls the driving (driving of an uncapping arm and a capping arm) of the opening and closing mechanism described below using FIG. 4. An opening portion is formed at the upper portion of the cap opening and closing apparatus 100 by the outer covers 101 and 102, and an opening and closing mechanism 108 for capping and uncapping a microtube 200 is exposed at the opening portion. With this structure, a worker or transfer machine can place the microtube 200 at a predetermined position of the opening and closing mechanism 108 and remove the microtube 200 from the opening and closing mechanism 108. The opening and closing mechanism 108 includes a first arm (hereinafter referred to as an uncapping arm 111) and a second arm (hereinafter referred to as a capping arm 112) that operate to open and close a cap 202 of the microtube 200 placed at the predetermined position.

The DC servo motor 131*a* rotationally drives the capping arm 112. A bevel gear 132*a* is provided at a motor shaft tip of the DC servo motor 131*a*, and the bevel gear 132*a* is meshed with a bevel gear 132*b* connected to a rotary shaft of the capping arm 112. With this configuration, the rotation of the shaft of the DC servo motor 131 rotates the capping arm 112 pivoting at the rotary shaft. The uncapping arm 111 also has a similar configuration (including the DC servo motor 131*b* and bevel gears 132*c* and 132*d*) and is rotated by the rotation of the DC servo motor 131*b*. The uncapping arm 111 and the capping arm 112 can operate independently and have a shape and position that do not interfere with the other arm in the respective operating regions.

Figure 2A:
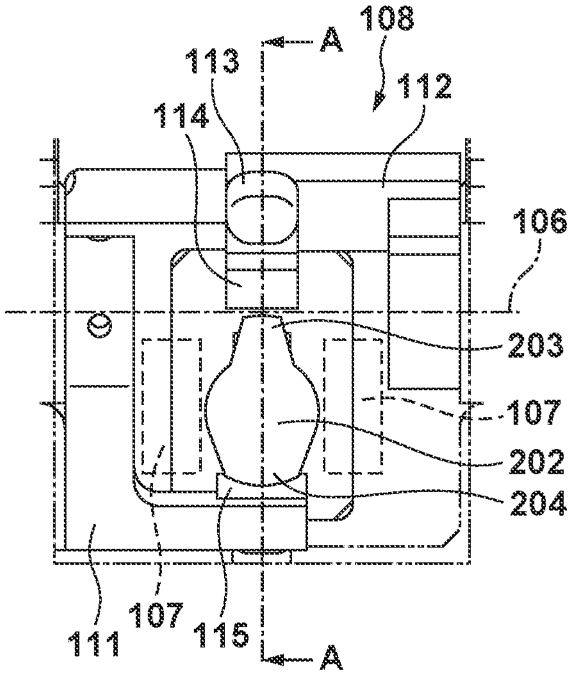
FIGS. 2A to 2D are diagrams illustrating in detail an opening and closing portion of the cap opening and closing apparatus according to the first embodiment.
Figure 2B:
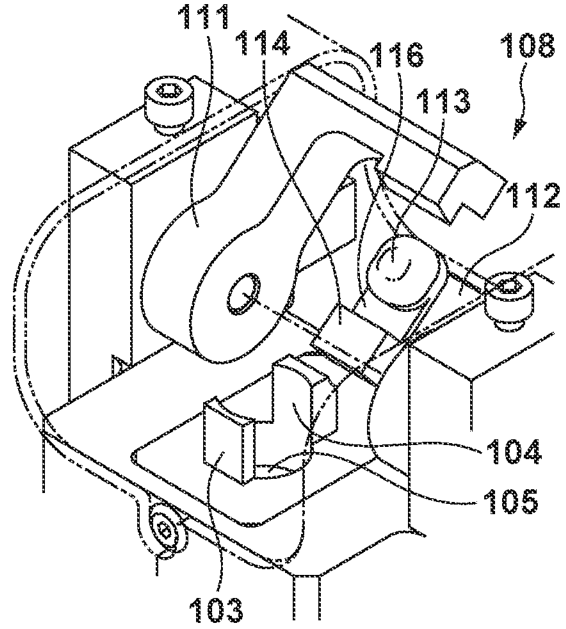
Figure 2C:
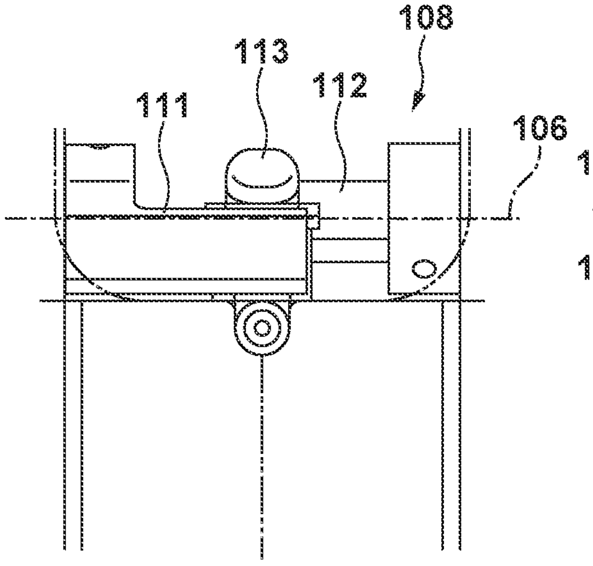
Figure 2D:
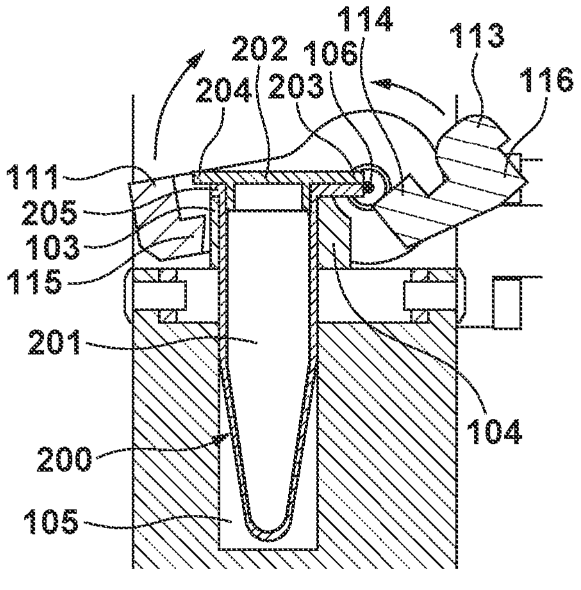

Next, the opening and closing mechanism 108 of the cap opening and closing apparatus 100 will be described in more detail. FIGS. 2A to 2D are diagrams for describing the configuration of the opening and closing mechanism 108. FIG. 2A is a view as seen from above (arrow 191 in FIG. 1B) the opening and closing mechanism 108. FIG. 2D is a cross-sectional view taken along A-A in FIG. 2A. FIG. 2C is a view as seen from the front (arrow 192 in FIG. 1B) of the opening and closing mechanism 108. FIG. 2B is a diagram illustrating the opening and closing mechanism 108 in a state where the microtube 200 is not inserted and the uncapping arm 111 is rotated.

The microtube 200 is placed at the predetermined position by being inserted into an insertion hole 105. As illustrated in FIG. 2D, the microtube 200 includes a container body 201 and the cap 202 connected to the container body 201 via a hinge portion 203. The edge portion of the cap 202 is provided with a projection portion 204, which is a portion that projects out past a rim portion 205 of the container body 201. The projection portion 204 may be used in opening the cap 202. The rim portion 205 is provided at the opening of the container body 201. A portion of the rim portion 205 extends in the radial direction of the opening of the container body 201 and connects with the hinge portion 203. The projection portion 204 and the hinge portion 203 are provided at opposite positions.

The uncapping arm 111 and the capping arm 112 are driven by the DC servo motors 131*b* and 131*a* to rotate about a rotation axis 106. The uncapping arm 111 according to the present embodiment has a substantially L-like shape with one end being connected to the rotary shaft coaxially aligned with the rotation axis 106. The other end of the uncapping arm 111 is provided with a catch portion 115 configured to engage with the lower side of the projection portion 204 provided on the cap 202 of the microtube 200. The catch portion 115 moves in a circumferential direction centered at the rotation axis 106 as the uncapping arm 111 rotates. In the moving process, the catch portion 115 engages with the projection portion 204 and pushes the projection portion 204 from below, with this action opening the cap 202. Also, as illustrated in FIG. 2D, the catch portion 115 has a tapered cross-sectional shape. In this manner, at the rotational position (standby position of the uncapping arm 111 (described below using FIGS. 2A to 2D and FIGS. 3A to 3D)) of the uncapping arm 111 illustrated in FIG. 2D, the catch portion 115 can be moved toward a front support portion 103 and the catch portion 115 can reliably engage with the projection portion 204 of various shapes.

One end of the capping arm 112 is connected to the rotary shaft coaxially aligned with the rotation axis 106. The other end of the capping arm 112 is provided with a pressing member 116 formed with a first protrusion portion 113 and a second protrusion portion 114. The pressing member 116 moves in a circumferential direction centered at the rotation axis 106 as the capping arm 112 rotates. The pressing member 116 extends in a direction parallel (offset) with the direction intersecting (in the present example, the direction orthogonal with) the rotation axis 106 and includes, at the end portion on the side farther from the rotation axis 106, the first protrusion portion 113 that comes into contact with the upper surface of the cap 202 at a substantially central portion (preferably the central portion or a portion on the projection portion 204 side of the central portion) of the cap 202.

Accordingly, when the pressing member 116 moves as described above, the first protrusion portion 113 presses a substantially central portion of the cap 202 in a capping direction and caps the microtube 200. The second protrusion portion 114 of the pressing member 116 is provided at the end portion on the side closer to the rotation axis 106 and rotationally moves about the rotation axis 106. In this manner, by the second protrusion portion 114 always moving around the area near the hinge portion 203, the microtube 200 lifting up is prevented. This action of the second protrusion portion 114 will be described below.

Note that in the present embodiment, the rotation axis 106 of the uncapping arm 111 and the capping arm 112 are the same axis, but no such limitation is intended. However, the rotation axes of the arms are preferably provided at or near the rotation axis defined by the hinge portion 203. In particular, the rotation axis 106 of the uncapping arm 111 and the capping arm 112 are preferably substantially aligned with the rotation axis (center of the arc of the trajectory of the capping and uncapping of the cap 202) of the hinge portion 203. The cap 202 is generally speaking opened and closed by pivoting at the rotation axis of the hinge portion 203. Thus, by the rotation axis of the uncapping arm 111 being disposed at or near the rotation axis of the hinge portion 203, the catch portion 115 can reliably engage with the projection portion 204 from during the uncapping operation to after the uncapping. Also, by the rotation axis of the capping arm 112 being disposed at or near the rotation axis of the hinge portion 203, the capping arm 112 can press in a vertical direction down on the upper surface of the cap 202 when capping. Accordingly, the pressing force of the capping arm 112 can reliably travel to the upper surface of the cap 202. Also, in the capping and uncapping operations, the second protrusion portion 114 rotates about the hinge portion 203. This can effectively prevent the microtube 200 from coming out of the insertion hole 105 at the initial stages of uncapping without the second protrusion portion 114 interfering with or separating too far from the hinge portion 203.

The insertion hole 105 is a hole for inserting the microtube 200 (container body 201). The front support portion 103 and a back support portion 104 support the rim portion 205 of the container body 201 when the microtube 200 is inserted into the insertion hole 105. The front support portion 103 supports the rim portion 205 at a position on the projection portion 204 side, and the back support portion 104 supports the rim portion 205 at a position on the hinge portion 203 side. By the front support portion 103 and the back support portion 104 supporting the rim portion 205 of the microtube 200, as illustrated in FIG. 2D, space for disposing the catch portion 115 below the projection portion 204 of the cap 202 is ensured. Regions 107 ensured on either side of the insertion hole 105 allow the gripper of a robot or the like to approach and insert or remove the microtube 200 from the insertion hole 105 (pick and place).

Next, the uncapping operation and the capping operation for a cap of a microtube by the opening and closing mechanism 108 will be described with reference to FIGS. 3A to 3D and FIG. 4. The cap opening and closing apparatus 100 according to the present embodiment uses the catch portion 115 of the uncapping arm 111 to push up the lower surface of the projection portion 204 and opens the cap 202 while suppressing movement in the position of the upper surface of the cap 202 via the pressing member 116 of the capping arm 112.

Accordingly, even if the cap 202 has different shapes, the cap 202 can be reliably opened and closed.

Figure 4:
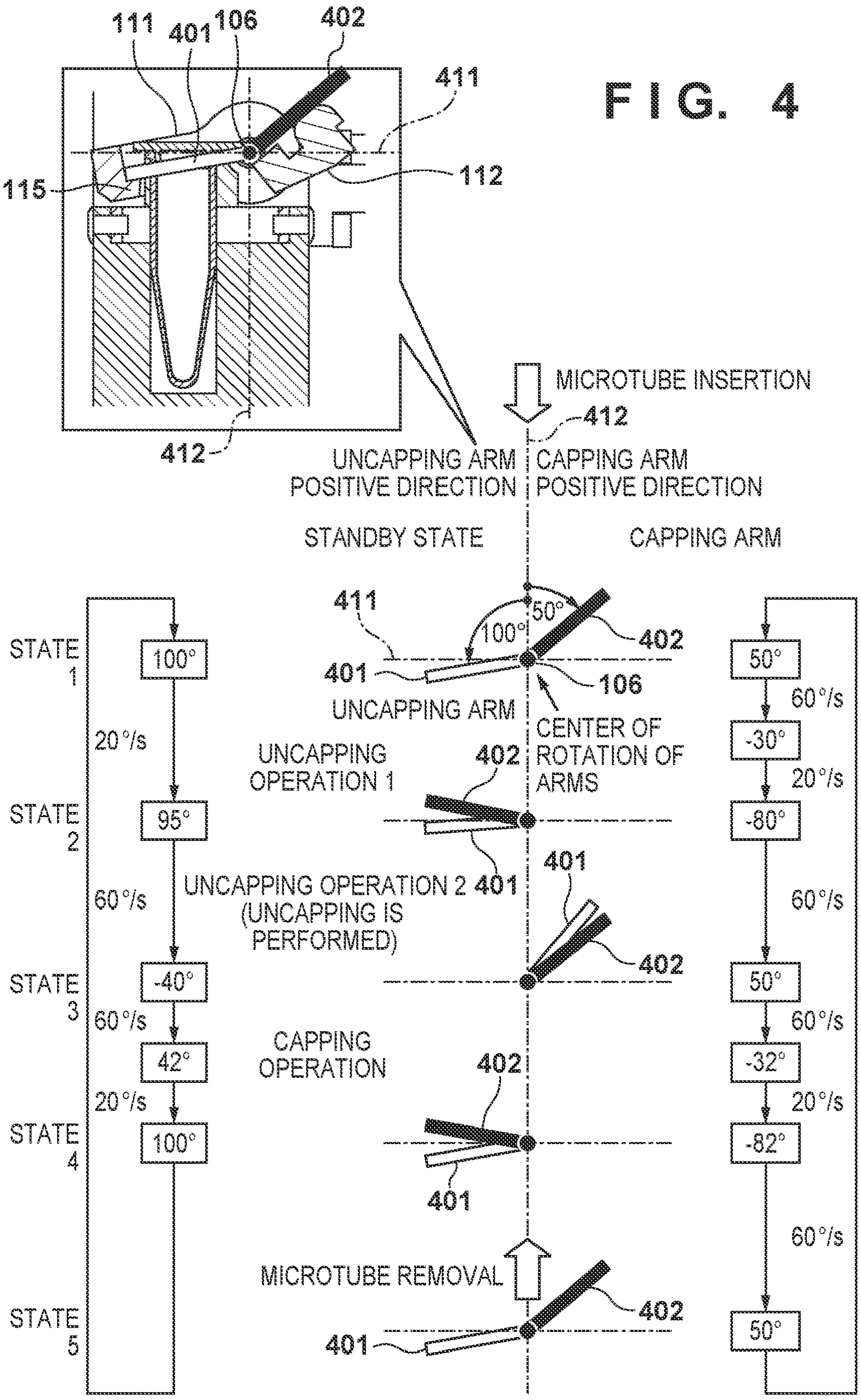
FIG. 4 is a diagram for describing control of an uncapping arm and a capping arm in the cap opening and closing operation according to the first embodiment.

FIGS. 3A to 3D are diagrams illustrating the operational state of the uncapping arm 111 and the capping arm 112 in the cap opening and closing operation of the opening and closing mechanism 108. Also, FIG. 4 is a diagram for describing rotation control of the uncapping arm 111 and the capping arm 112 in the cap opening and closing operation of the opening and closing mechanism 108. The rotation control of the uncapping arm 111 and the capping arm 112 illustrated in FIG. 4 is implemented by the control unit 121 controlling the driving of the DC servo motors 131*a* and 131*b*. In FIG. 4, a line segment 401 represents a straight line joining the rotation axis 106 and the surface of the catch portion 115 that engages with the projection portion 204, and a line segment 402 represents a straight line joining the rotation axis 106 and the apex (portion that comes into contact with the cap 202) of the first protrusion portion 113. In FIG. 4, the rotational positions of the uncapping arm 111 and the capping arm 112 are represented by the line segment 401 and the line segment 402. However, in FIG. 4, to facilitate understanding of the diagram, the line segment 401 is illustrated as a hollow rectangle and the line segment 402 is illustrated as a black rectangle. Hereinafter, the rotational position of the line segment 401 is also referred to as the rotational position of the uncapping arm 111. In a similar manner, the rotational position of the line segment 402 is also referred to as the rotational position of the capping arm 112. An axis 411 and an axis 412 pass through the rotation axis 106 and meet at a 90° angle. Also, in FIG. 4, the rotation angle of the uncapping arm 111 moves in the positive direction in the anticlockwise direction with 0 degrees being the position of the axis 412, and the rotation angle of the capping arm 112 moves in the positive direction in the clockwise direction with 0 degrees being the position of the axis 412.

In a state shown in FIG. 3A, the uncapping arm 111 and the capping arm 112 are in a standby state. In this state, the microtube 200 can be inserted into or removed from the insertion hole 105. In the state shown in FIG. 3A, a state in which the microtube 200 in a capped state is inserted into the insertion hole 105 is illustrated. This is the same as state 1 in FIG. 4, and the rotational position of the uncapping arm 111 is at 100° and the rotational position of the capping arm 112 is at 50°. The translation of the uncapping arm 111 and the capping arm 112 to the state 1 is executed in response to a signal from an external apparatus, for example. In this state, when an uncapping instruction signal is received from an external apparatus, for example, the control unit 121 starts the uncapping operation. When the uncapping operation starts, the uncapping arm 111 rotates in the clockwise direction to the position 95° and the capping arm 112 rotates in the anticlockwise direction to the position −80°, transitioning the state to a state 2 (state shown in FIG. 3B). In the state 2, the uncapping arm 111 has rotated to the position 95°, positioning the catch portion 115 at a position at or near the upper end of the front support portion 103, that is at or near the lower surface side of the projection portion 204. Also, the capping arm 112 has rotated to the rotational position −80°, positioning the pressing member 116 (the first protrusion portion 113 and the second protrusion portion 114) at or near the upper surface of the cap 202. At this time, the pressing member 116 may be substantially in contact with the upper surface of the cap 202, but contact is not necessary. The uncapping operation is performed as described below with the uncapping arm 111 and the capping arm 112 maintained in the specific rotational position relationship. Note that when transitioning from the state 1 to the state 2, the uncapping arm 111 rotates at a speed of 20°/s from 1000 to 95°. Also, the capping arm 112 rotates at a speed of 60°/s from 50° to −30° and at a speed of 20°/s from −30° to −80°. Note that when transitioning to the state 2, the rotational speed of the capping arm 112 decreases in order to prevent contact between the cap 202 and the first protrusion portion 113 due to rotation overshoot. As long as there is no overshoot, the capping arm 112 may rotate at a speed of 60°/s from 50° to −80°. In other words, a deviation between the command (target) angle and the actual angle of the capping arm 112 may increase in high-speed operations of the capping arm 112. When the operation of the capping arm 112 is an operation that possibly involves contact between the cap 202 and the first protrusion portion 113, such deviations must be reduced. In FIG. 4, to reduce such deviations, the capping arm 112 is operated at a low-speed from partway through the transition from the state 1 to the state 2. However, if there are no hindrances to controllability and operations, a slow speed is not particularly necessary. Also, the order of the operations of the uncapping arm 111 and the capping arm 112 up to the transition to the state 2 is not particularly limited. For example, one of the uncapping arm 111 and the capping arm 112 may arrive first at the rotational position of the state 2, or the uncapping arm 111 and the capping arm 112 may simultaneously arrive at the rotational position of the state 2.

Figure 7A:
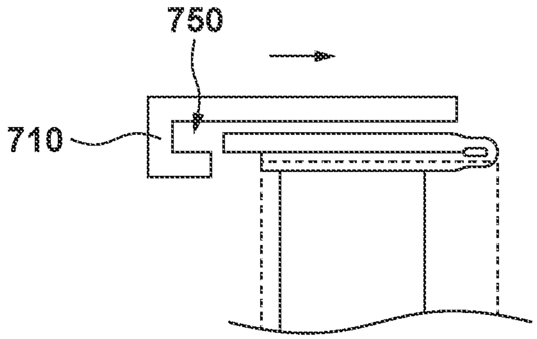
FIGS. 7A to 7C are diagrams illustrating a known cap opening and closing mechanism.
Figure 7B:
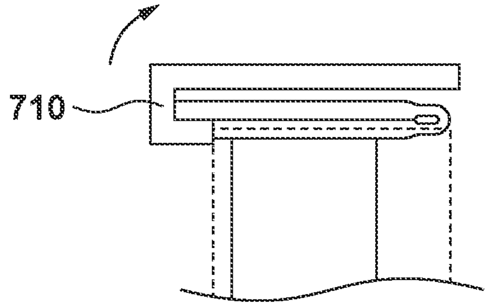
Figure 7C:
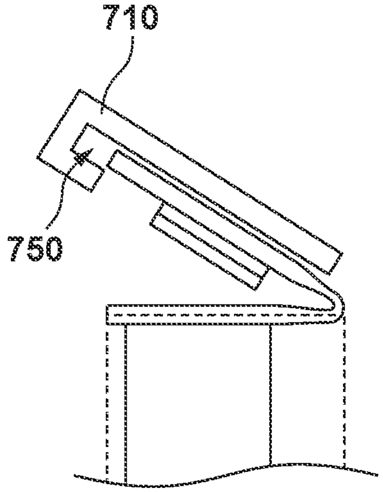

Subsequently, the uncapping arm 111 rotates in the clockwise direction from 95° to −40° and the capping arm 112 rotates from −80° to 50° at the same speed (60°/s), transitioning from the state 2 to a state 3. In other words, the uncapping arm 111 and the capping arm 112 rotate in the clockwise direction while maintaining the angle (specific rotational position relationship) between the arms of the state 2. During this rotation, the catch portion 115 of the uncapping arm 111 is engaged with the projection portion 204 of the cap 202, and thus the cap 202 is opened. Also, with the microtube 200 in a state of being inserted into the insertion hole 105, the rotation axis defined by the hinge portion 203 and the rotation axis 106 of the uncapping arm 111 are substantially parallel and locate near one another. Thus, during the rotation of the uncapping arm 111, the positional relationship between the catch portion 115 and the projection portion 204 of the cap 202 stays substantially constant, and the cap 202 can be opened by the rotational position −40° of the uncapping arm 111. For example, with the configuration of Patent Document 1 described using FIGS. 7A to 7C, the tip of the cap is inserted into the fastening portion (750) by sliding the opening and closing portion (710). Thus, the rotation axis of the opening and closing portion (710) is separated from the hinge portion of the cap. Accordingly, as illustrated in FIG. 7C, after the cap has been opened a certain amount, the cap separates from the fastening portion (750), limiting the opening angle of the cap. Then, as illustrated in the state shown in FIG. 3C, opening of the cap 202 of the microtube 200 is complete. In the state 3, the microtube 200 is sufficiently open, allowing access to inject a reagent into the microtube 200.

The angle of the uncapping arm 111 in the state 3 is not required to be −40°. It is sufficient that the cap is open enough so that a pipette used in pipetting or other post-uncapping operation does not interfere with the cap. However, since the cap 202 is located between the uncapping arm 111 and the capping arm 112, the relative angle (in other words, the angle formed by the line segment 401 and the line segment 402.) between the uncapping arm 111 and the capping arm 112 must be ensured by a predetermined amount. Taking into account variation in the cap 202, the rotational position relationship between the uncapping arm 111 and the capping arm 112 maintained when uncapping is preferably a relative angle ranging from 10° to 35°, for example. In other words, during the transition from the state 2 to the state 3, the angle formed by the uncapping arm 111 and the capping arm 112 is kept within a predetermined angle range (for example, from 10° to 35°), that is this specific rotational position relationship is maintained. Regarding the rotational position relationship between the arms maintained when uncapping, when the relative angle between the arms is increased, the permissible change in thickness of the cap 202 is increased, but the capability to prevent the microtube 200 lifting is reduced.

Also, as described above, the rotation axis 106 is also the rotation axis of the capping arm 112. Accordingly, when the microtube 200 is in a state of being inserted into the insertion hole 105, the rotation axis of the capping arm 112 is also substantially parallel with and located near the rotation axis of the hinge portion 203. Thus, during the rotation of the capping arm 112 from the state 2 to the state 3, the second protrusion portion 114 near the rotation axis 106 rotates near the hinge portion 203 of the microtube 200. Via this operation, when the projection portion 204 of the cap 202 of the microtube 200 is pushed up by the catch portion 115 of the uncapping arm 111, lifting of the microtube 200 is prevented by the second protrusion portion 114 and the uncapping operation can be more reliably performed.

Note that in the present embodiment, in the state 2, the capping arm 112 is rotated to the position −80° so that pressing member 116 substantially comes into contact with the upper surface of the cap 202, but this is not necessary. For example, the rotational position of the capping arm 112 may be at approximately −60°, for example, as long as the second protrusion portion 114 can prevent or allow lifting of the microtube 200. Also, in the present embodiment, in the transition from the state 2 to the state 3, the uncapping arm 111 rotates in the clockwise direction 135° and the capping arm 112 rotates in the clockwise direction 130°. This is to open the cap 202 of the microtube 200 at a larger angle and allow for easy pipetting operations after uncapping. Note that in the example in FIG. 4, the angle between the uncapping arm 111 and the capping arm 112 is smaller in the state 3 compared to the state 2. Accordingly, when in an uncapped state and in capping operations, the cap 202 is pinched by the uncapping arm 111 and the capping arm 112 at a narrower angle, allowing for a more stable uncapped state to be maintained and for a more stable capping operation. However, the rotation control of the uncapping arm 111 and the capping arm 112 is not limited to this. For example, in the state 3, the uncapping arm 111 may be stopped at the rotational position −35° and the capping arm 112 may be stopped at a rotational position 55°. Also, in the state 2, the rotational position of the uncapping arm 111 may be 90°, and an angle of 10° between the uncapping arm 111 and the capping arm 112 may be maintained as the arms transition to the state 3. Furthermore, as described above, the uncapping operation (the transition from the state 2 to the state 3) is performed by rotating the uncapping arm 111 and the capping arm 112 at the same speed and maintaining a constant angle between the arms. However, no such limitation is intended. The transition from the state 2 to the state 3 may be performed by maintaining the angle between the uncapping arm 111 and the capping arm 112 within a predetermined range (for example, from 10° to 35°) with the cap 202 positioned between the uncapping arm 111 and the capping arm 112. Thus, in the transition from the state 2 to the state 3 illustrated in FIG. 4, the uncapping arm 111 and the capping arm 112 both have a rotational speed of 60°/s, but the rotational speeds of the arms do not need to be the same. For example, the uncapping arm 111 may be rotated at 60°/s, and the capping arm 112 may be rotated at 58°/s, so that both arms arrive at the rotational position of the state 3 at substantially the same time.

Next, the capping operation will be described. For example, the control unit 121 starts the capping operation in response to a capping instruction signal from an external apparatus. By rotating the uncapping arm 111 from −40° to 100° and rotating the capping arm 112 from 50° to −82° to transition from the state 3 to a state 4, the cap 202 of the microtube 200 is closed. This state is illustrated in in FIG. 3D. In transitioning from the state 3 to the state 4, the uncapping arm 111 rotates at a speed of 60°/s from −40° to 42° and rotates at 20°/s from 42° to 100°. Also, the capping arm 112 rotates at a speed of 60°/s from 50° to −32° and at a speed of 20°/s from −32° to −82°. In this manner, in the operation by the capping arm 112 to close the cap 202, the rotational speed is slowed just before capping. This reduces tracking delay with respect to the target angle of the capping arm 112 and allows the cap 202 to be more reliably closed. Also, by the capping arm 112 being rotated more than needed (2° in the present example) in the negative direction (anticlockwise direction) compared to the state 2, the cap 202 is reliably pressed against the container body 201 to implement capping. Note that when capping (transitioning from the state 3 to the state 4), a specific rotational position relationship between the uncapping arm 111 and the capping arm 112 is maintained. However, no such limitation is intended. When capping, it is sufficient that the uncapping arm 111 operates in a manner so as to not inhibit the capping operation by the capping arm 112. For example, the uncapping arm 111 may rotate at a speed of 60° all the way to the position 100°.

Thereafter, only the capping arm 112 rotates in the clockwise direction from the position −82° to 50°, transitioning to a state 5, and the uncapping arm 111 and the capping arm 112 return to the standby state (the state shown in FIG. 3A). In this state, the microtube 200 can be removed from the insertion hole 105. Also, after the microtube 200 is removed, a new microtube 200 can be inserted into the insertion hole 105 (state 1).

Figure 5A:
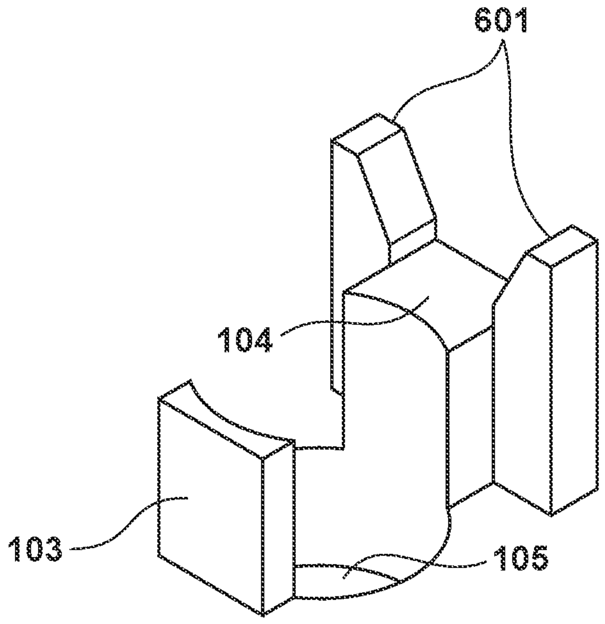
FIG. 5A is a diagram illustrating a modified example of a back support portion provided at an insertion hole.

Note that in the opening and closing mechanism 108, the rotation axis 106 of the uncapping arm 111 and the capping arm 112 and the rotation axis of the hinge portion 203 of the microtube 200 inserted into the insertion hole 105 are preferably near one another and most preferably parallel. Also, a pair of guide portions 601 may be provided at the back support portion 104 as illustrated in FIG. 5A. In other words, the pair of guide portions 601 are provided on either side of the back support portion 104, and the guide portions 601 include tapered opposing surfaces with the gap between the pair of guide portions 601 decreasing toward the support surface of the back support portion 104. With this configuration, the orientation of the microtube 200 inserted into the insertion hole 105 can be stabilized so that the rotation axis 106 of the uncapping arm 111 and the capping arm 112 is made parallel with the rotation axis of the hinge portion 203.

Figure 5B:
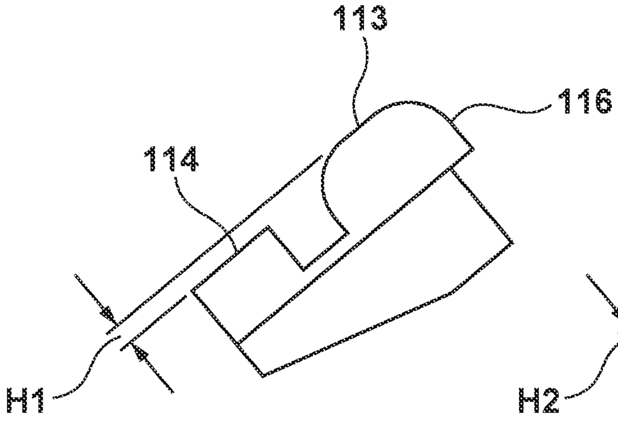
FIG. 5B is a diagram for describing a pressing member.
Figure 5C:
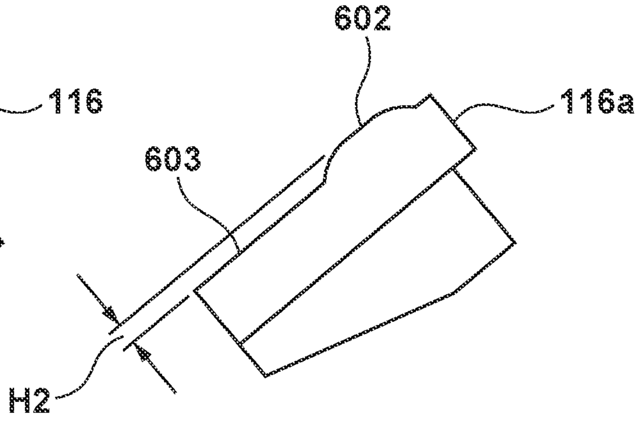
FIG. 5C is a diagram illustrating a modified example of the pressing member.

Also, as illustrated in FIG. 5B, the pressing member 116 includes the first protrusion portion 113 and the second protrusion portion 114. However, the pressing member 116 is not limited to this configuration, and it is sufficient that the pressing member 116 has a structure with the maximum thickness on the side farther from the rotation axis. For example, as illustrated in FIG. 5C, a pressing member **116*a* may include a portion 603 with the same thickness as the second protrusion portion 114 and a protrusion portion 602 with the same height as the first protrusion portion 113. In this case, a height difference H1 between the first protrusion portion 113 and the second protrusion portion 114 is equal to a height H2 of the protrusion portion 602 with respect to the portion 603. Note that by the first protrusion portion 113 and the protrusion portion 602 having a substantially spherical surface shape, even when the height of the cap upper surface has slight variance, when capping, the capping force can be reliably concentrated at a central position or a position just to the front of the central position of the cap. When the first protrusion portion 113** has a flat surface and there is variance in the height of the cap upper surface, the pressing position may be misaligned to the front or back.

Also, the second protrusion portion 114 as described above has the function of preventing the microtube 200 from lifting in the uncapping operation. As illustrated in FIG. 5B, by the second protrusion portion 114 being disposed at the back end portion (rotation axis side) of the pressing member 116, even when the angle of the capping arm 112 changes, the second protrusion portion 114 always stays at or near the center of rotation, allowing the effect of preventing the microtube 200 from lifting to be effective in a large area. Accordingly, the constraints on the angle accuracy of the pressing member 116 when capping can be relaxed, and the effect of caps of various shapes can be accommodated for is obtained. In the case of FIG. 5C, when H2 is close to 0 (when the portion 603 is close to the height of the protrusion portion 602), the effect of preventing lifting can be obtained. However, when the pressing surface side of the pressing member **116*a*, the capping force is inhibited as described above. On the other hand, when the first protrusion portion 113 and the second protrusion portion 114 have substantially the same height, that is H1 #0, as long as the pressing member 116 includes a recess portion between the two as in FIG. 5B, the effects described above can be obtained. However, the hinge portion 203 and the second protrusion portion 114 must be interfere with one another when the capping arm 112 is opened. By ensuring a certain amount for the difference H1 between the first protrusion portion 113 and the second protrusion portion 114, interference between the hinge portion 203 and the second protrusion portion 114** can be reliably avoided.

The position (angle) relationship between the uncapping arm 111 and the capping arm 112 when capping and uncapping is summarized as follows.

1. The cap 202 is located between the uncapping arm 111 and the capping arm 112. Accordingly, the relative angle between the uncapping arm 111 and the capping arm 112 is ensured to be a predetermined amount or greater without the capping arm 112 being positioned more to the capping side than the uncapping arm 111. In the case of the capping arm 112 being positioned more to the capping side than the uncapping arm 111, the cap 202 may break or the DC servo motor may stop due to an excessive load.
2. The opening of the cap 202 is performed mainly by the uncapping arm 111, and the angle relationship between the uncapping arm 111 and the capping arm 112 is maintained so that the second protrusion portion 114 can prevent the microtube 200 from lifting. At this time, the first protrusion portion 113 does not need to be in contact with the cap upper surface. Accordingly, the cap opening and closing apparatus 100 can accommodate various microtubes 200.
3. The closing of the cap 202 is mainly performed by the capping arm 112. At this time, it is sufficient that the uncapping arm 111 is at a position that does not inhibit the capping operation by the capping arm 112. Also, the cap 202 is preferably pressed against the container body 201 by the capping arm 112 after the rotational speed of the capping arm 112 has decreased.

Figure 6A:
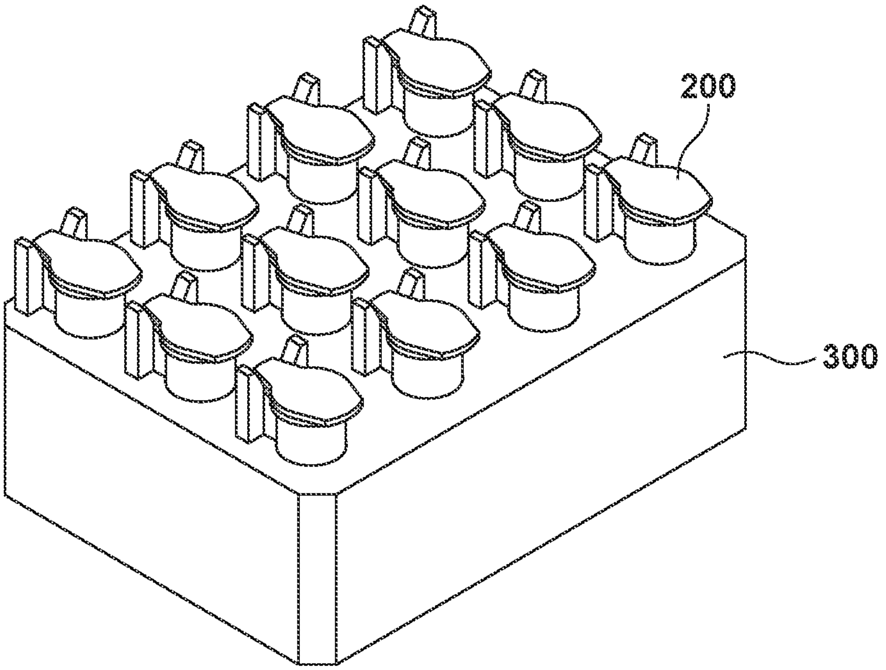
FIGS. 6A to 6C are diagrams for describing a microtube rack for housing microtubes.
Figure 6B:
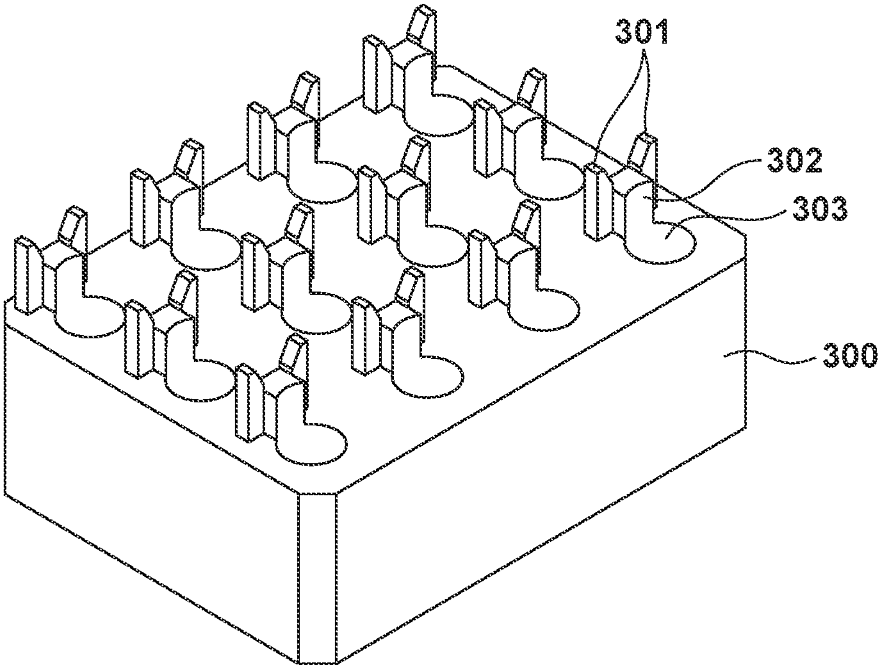

FIGS. 6A and 6B are diagrams illustrating a microtube rack 300 that can house a plurality of microtubes and can be used in the automatic transfer of the microtube 200 into the insertion hole 105 of the cap opening and closing apparatus 100. As illustrated in FIG. 6A, the microtube rack 300 houses a plurality of microtubes. The plurality of microtubes 200 housed in the microtube rack 300 are gripped one at a time by a robot hand and transferred to the cap opening and closing apparatus 100.

As illustrated in FIG. 6B, the microtube rack 300 is provided with a plurality of insertion portions for placing the microtubes 200. Each insertion portion includes an insertion hole 303, a pair of guide portions 301, and a support portion 302 provided between the pair of guide portions 301. A portion of the surface of the support portion 302 is formed continuously with the inner surface of the insertion hole 303. When the microtube 200 is inserted into the insertion hole 303 with the hinge portion 203 of the microtube 200 placed between the pair of guide portions 301, the hinge portion 203 (or the rim portion 205 on the hinge portion 203 side) is supported by the support portion 302. Each guide portion 301 is tapered with the gap between the pair of guide portions 301 decreasing toward the insertion hole 303, and the tapered surfaces of the guide portions 301 connect with the support portion 302. With this configuration, when a robot or a worker places the microtube 200 into the insertion hole 303, misorientation of the microtube 200 is allowed and corrected. Also, by the hinge portion 203 (or the rim portion at or near the hinge portion 203) of the microtube being supported by the support portion 302, the lid height can be made substantially constant regardless of the length of the microtube placed in the insertion hole 303. Accordingly, when a robot or a worker transfers the microtube 200 from the microtube rack 300 to the cap opening and closing apparatus 100, the microtube is easily gripped. Note that as illustrated in FIG. 6C, the insertion portion may include a front support portion 304 (with a similar function as the front support portion 103 described above) for supporting the projection portion 204 of the cap 202.

Figure 6C:
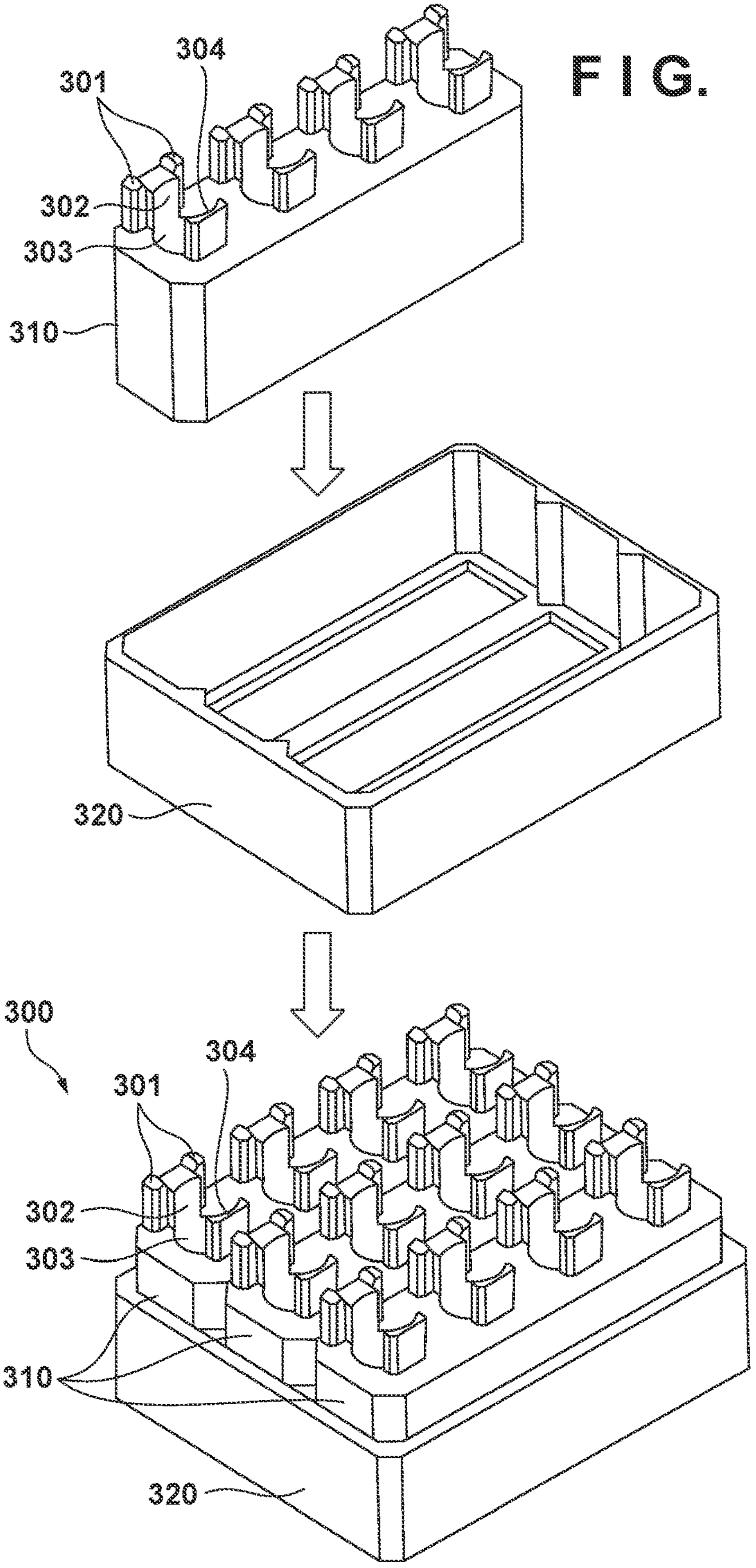

Also, as illustrated in FIG. 6C, a plurality of racks 310 with a plurality of insertion portions for accommodating the plurality of microtube 200 aligned in one row may be housed in a rack case 320 to form a microtube rack 330 including insertion portions disposed in rows and columns. For example, by preparing the rack case 320 with racks 310 of different housing states, a microtube rack with insertion portions in various arrangements of rows and columns can be formed. For example, as illustrated in FIGS. 6A to 6C, by preparing the rack case 320 in which three racks 310 including 1 row and 4 columns are disposed vertically next to one another, the microtube rack 330 in which the insertion portions for microtubes are arranged in 3 rows and 4 columns is obtained. Such a microtube rack is conducive to robot-performed tasks. Also, by preparing a rack case (not illustrated) in which three racks 310 are arranged horizontally next to one another, a microtube rack in which the insertion portions are arranged in 1 row and 12 columns is obtained. Such a microtube rack is conducive to the manual task of workers opening and closing the microtubes. In this manner, by forming a microtube rack using the racks 310 and the rack case 320, for example, a microtube rack with an arrangement of insertion portions which is conducive to robot-performed and worker-performed tasks is obtained, allowing work to be shared by robots and workers.

According to the microtube rack 300 described above, the plurality of microtubes 200 can be easily housed with uniform direction and orientation. Also, a transfer machine for transferring the microtube 200 from the microtube rack 300 to the opening and closing mechanism 108 (insertion hole 105) of the cap opening and closing apparatus 100 in the correct direction can be more easily realized.

Second Embodiment

According to the configuration of first embodiment described above, the microtube 200 is prevented from lifting by the uncapping arm 111 and the capping arm 112 and the microtube 200 is more reliably uncapped. However, in the first embodiment, in the uncapping operation, when the cap 202 and the container body 201 separate, a relatively large vibration can be applied to the container body 201. The vibration applied to the container body 201 may plausibly cause the sample or reagent inside the container body 201 to spill or mix. In the second embodiment, the cap 202 is bent and uncapped by the uncapping arm 111 and the capping arm 112. Accordingly, when the cap 202 and the container body 201 are pressed together, a portion of the cap 202 is separated from the container body 201 to inhibit the generation of vibration at the microtube 200 when uncapping.

Figure 8:
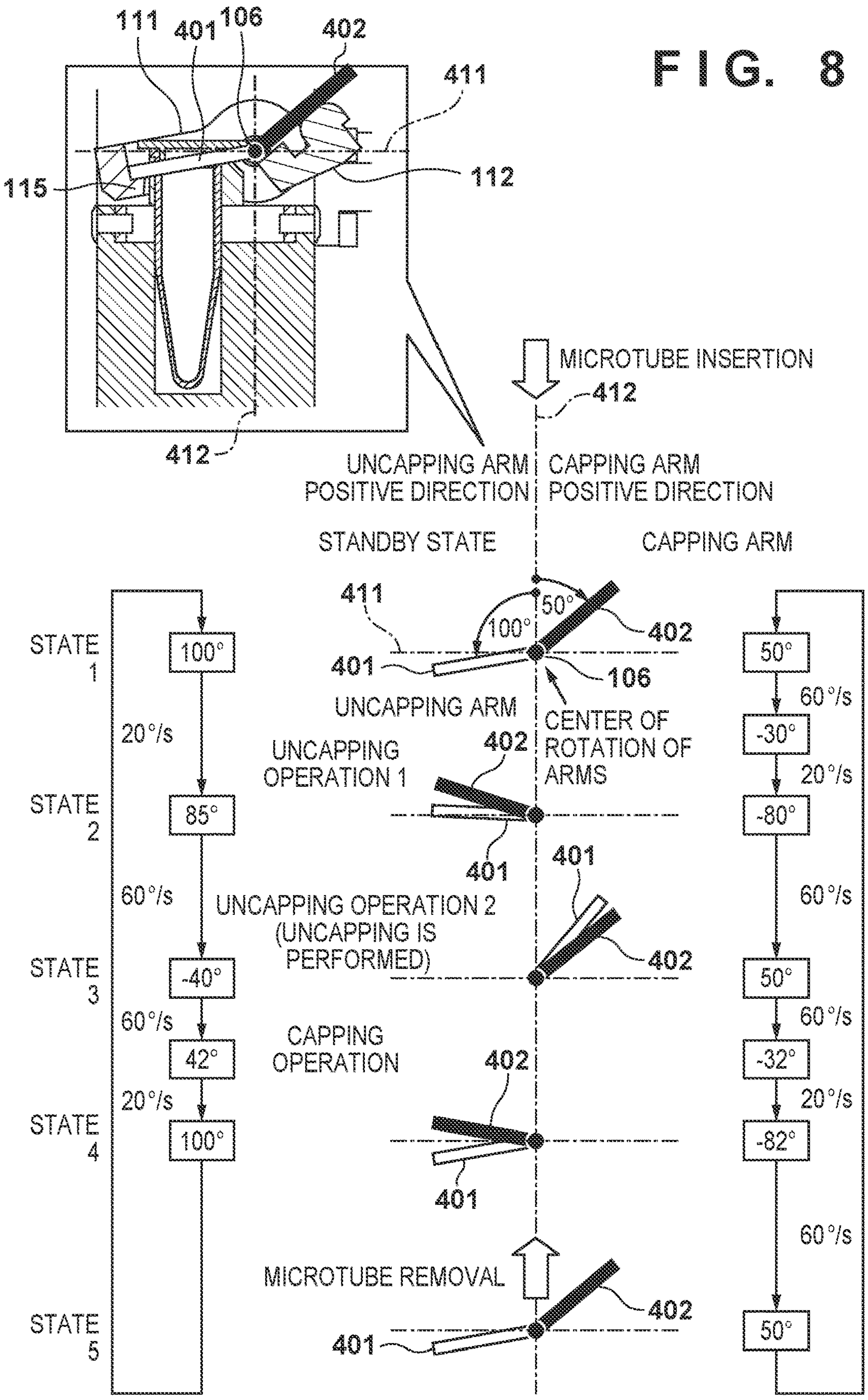
FIG. 8 is a diagram for describing control of an uncapping arm and a capping arm in a cap opening and closing operation according to a second embodiment.

The configuration of the cap opening and closing apparatus 100 according to the second embodiment is similar to the configuration according to the first embodiment (FIGS. 1A, 1B, 2A, 2B, 2C, and 2D). FIG. 8 is a diagram for describing rotation control of the uncapping arm 111 and the capping arm 112 in the cap opening and closing operation by the control unit 121 according to the second embodiment. The positional relationship between the uncapping arm 111 and the capping arm 112 in the state 2 is different to that in the rotation control (FIG. 4) according to the first embodiment. In the state 2 in FIG. 8, the rotational position of the uncapping arm 111 is 85°, for example, the rotational position of the capping arm 112 is −80°, for example, and the angle between the uncapping arm 111 and the capping arm 112 is 5°. In the state 2, the substantially central portion of the cap 202 is pressed from above by the first protrusion portion 113 of the capping arm 112 and the projection portion 204 of the cap 202 is lifted from below by the catch portion 115 of the uncapping arm 111, with this state causing the cap 202 to bend. In this manner, bending the cap 202 creates separation between the container body 201 and a portion (the portion on the projection portion 204 side that engages with the catch portion 115) of the cap 202. Thereafter, when the uncapping arm 111 and the capping arm 112 are rotated in the clockwise direction and transitioned to the state 3, the separation between the container body 201 and the cap 202 gradually increases and then uncapping of the microtube 200 is complete. Such an uncapping operation decreases the vibrations and the like applied to the microtube 200 when uncapping.

Note that in the state 2 in FIG. 8, the rotational position of the uncapping arm 111 is 850 and the rotational position of the capping arm 112 is −80°. However, no such limitation is intended, and as described above, it is sufficient that a state in which the cap 202 is bent is realized. Also, the order of the operations of the uncapping arm 111 and the capping arm 112 up to the transition to the state 2 is not particularly limited. For example, the uncapping arm 111 may arrive at the rotational position 85° first with the capping arm 112 arriving at the rotational position −80° after, or the capping arm 112 may arrive at the rotational position −80° first with the uncapping arm 111 arriving at the rotational position 85° after. Alternatively, the uncapping arm 111 and the capping arm 112 may simultaneously arrive at the rotational position of the state 2.

The transition from the state 2 to the state 3 is performed as in the first embodiment, and then the uncapping of the microtube 200 is complete. In other words, a specific rotational position relationship is maintained, with the angle formed by the uncapping arm 111 and the capping arm 112 being kept within a predetermined angle range (for example, from 10° to 35°) while the uncapping arm 111 and the capping arm 112 are rotated in the clockwise direction. The state 3, the state 4, and the state 5 are also as in the first embodiment.

In this manner, according to the second embodiment, vibrations caused at the microtube 200 when uncapping the microtube 200 can be reduced.

Third Embodiment

In the second embodiment, in the state 2 in FIG. 8, the rotational position relationship between the uncapping arm 111 and the capping arm 112 is set so that the cap 202 is bent to separate a portion of the cap 202 from the container body 201. This reduces the vibrations applied to the microtube 200 when uncapping. In the third embodiment, vibrations caused at the microtube 200 are reduced by providing a mechanism for holding the side surface of the microtube 200 when uncapping is started.

Figure 12:
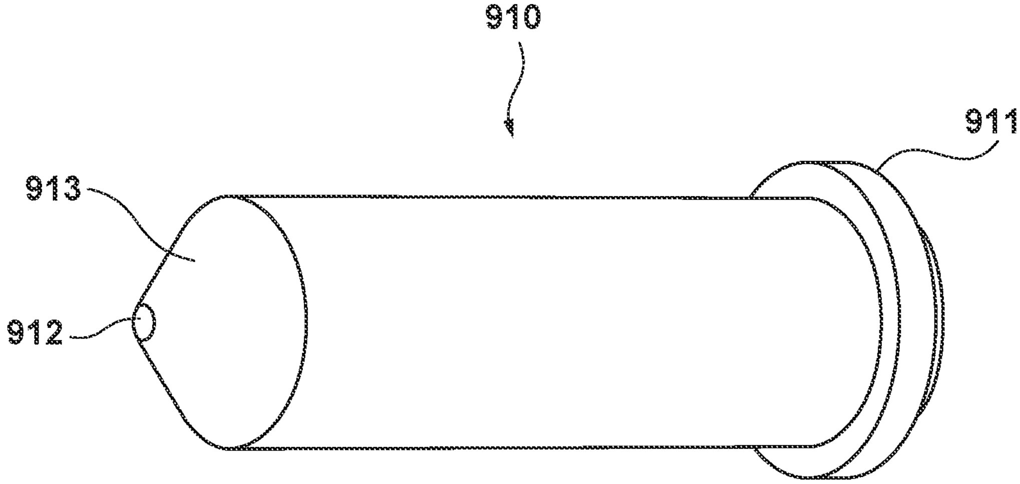
FIG. 12 is a diagram illustrating the shape of the pin.

Except for the opening and closing mechanism 108, the configuration of the cap opening and closing apparatus 100 according to the third embodiment is substantially similar to the configuration according to the first embodiment (FIGS. 1A and 1B and 2A to 2D). FIGS. 9A to 9C are diagrams for describing the structure of the opening and closing mechanism 108 according to the third embodiment. As illustrated in FIG. 9A, the capping arm 112 includes a biasing member 901. As illustrated in FIGS. 9B and 9C, the biasing member 901 includes a first portion 902, a second portion 904 thinner than the first portion 902, and an inclined portion 903 with a changing thickness that connects the first portion 902 and the second portion 904. As illustrated in FIG. 9C, a pin 910 includes one end portion that comes into contact with the wall surface of the microtube 200 inserted into the insertion hole 105 and other end portion (flange side) on the opposite side that comes into contact with the biasing member 901 of the capping arm 112. The pin 910 is provided in a manner allowing it to slide in the direction of an arrow 920 according to the position of contact with the biasing member 901. As illustrated in FIG. 9A, by installing the capping arm 112 including the biasing member 901, depending on the rotation operation of the capping arm 112, the surfaces of the first portion 902, the inclined portion 903, and the second portion 904 sequentially come into contact with the pin 910. The stroke of the slide of the pin 910 with the biasing member 901 corresponds to a difference d in thickness between the first portion 902 and the second portion 904. When the pin 910 and the first portion 902 are in contact, a force that moves the pin 910 to project into the insertion hole 105 is applied, making the pin 910 press against the side surface of the microtube 200 inserted into the insertion hole 105. In this state (pressed state), the microtube 200 is pressed between the pin 910 and the wall surface of the insertion hole 105 and fixed in place. In this manner, when the uncapping operation is performed with the microtube 200 in this fixed state, vibrations at the microtube 200 when uncapping are reduced. FIG. 12 is a diagram for describing the shape of the pin 910. The pin 910 is inserted into a pin hole extending in the direction of the arrow 920, the insertion direction is restricted by a flange 911, and the removal direction is restricted by the biasing member 901 of the capping arm 112. This ensures that the pin 910 does not fall out from the pin hole. Also, a tip portion 913 of the pin 910 has a conical shape including a circular flat surface 912. By the conical shape including a circular flat surface 912, the surface pressure of the pressing portion on the microtube 200 is increased and localized deformation is produced without damaging the microtube 200 in terms of hindering functionality. In this state, the microtube 200 can be reliably held. The diameter of the circle is in a range from 0.2 to 1 mm (preferably approximately 0.4 mm). The pin pressing amount from the microtube surface is in a range from 0.2 to 1 mm (preferably approximately 0.4 mm).

Figure 10A:
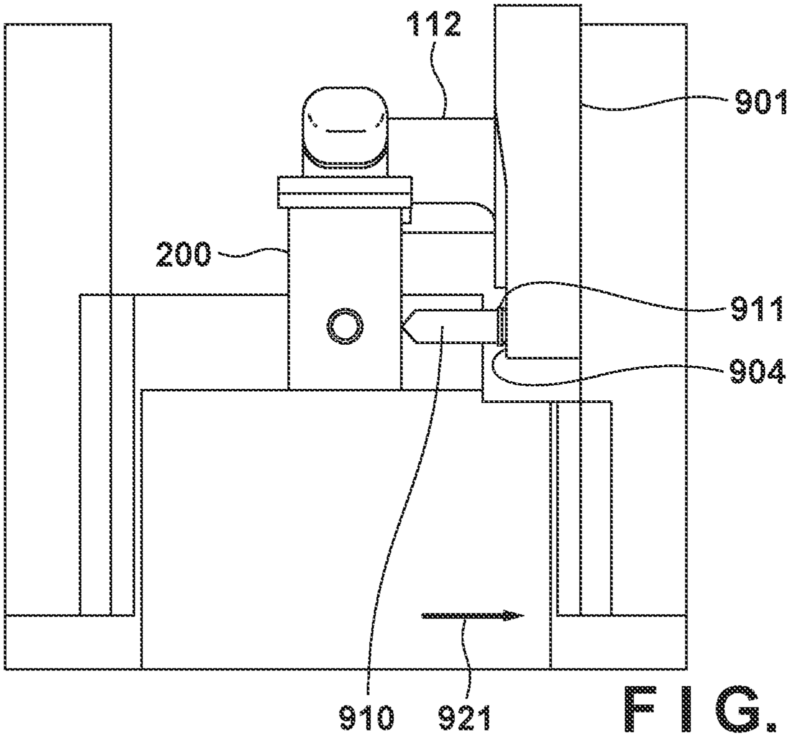
FIGS. 10A and 10B are diagrams for describing the movement of the capping arm and the pin for fixing a microtube according to the third embodiment.
Figure 10B:
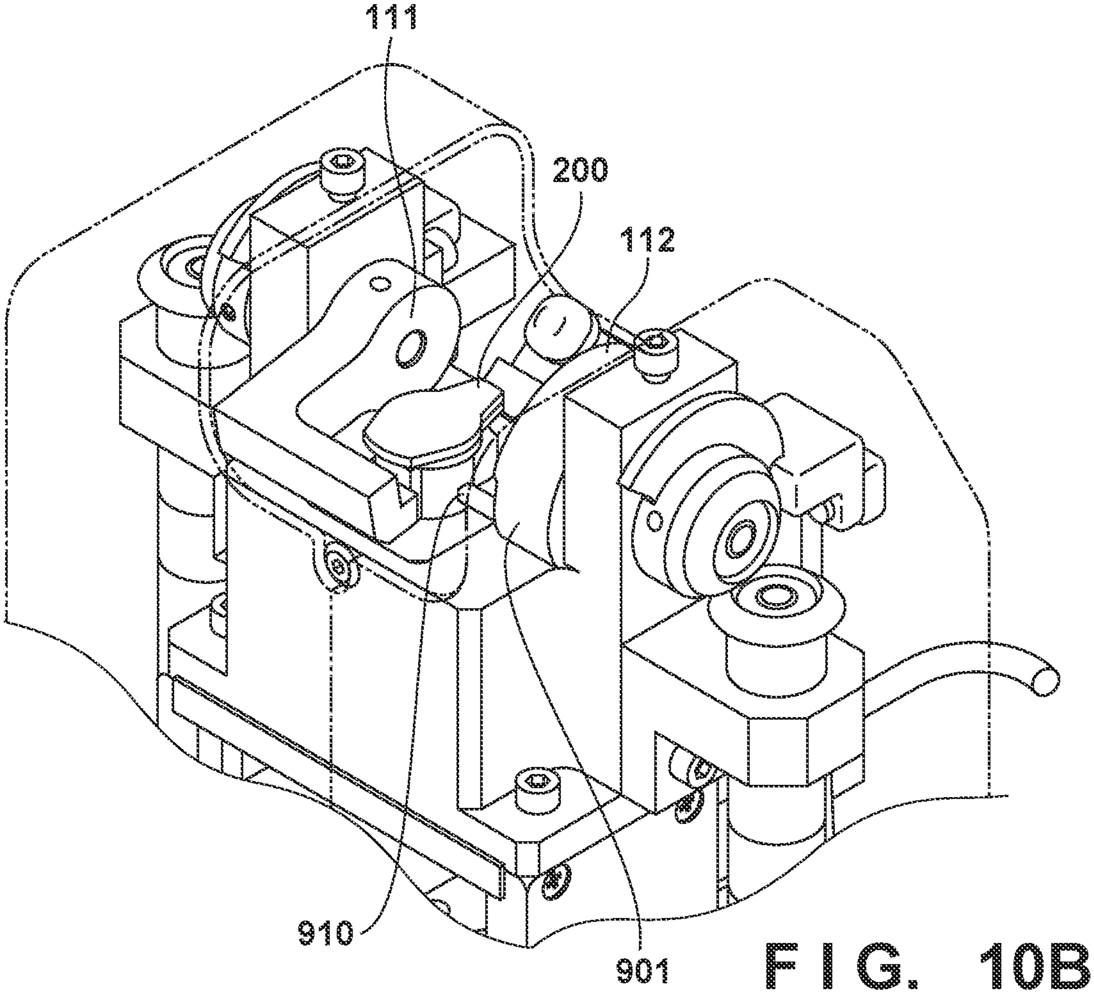
Figure 11A:
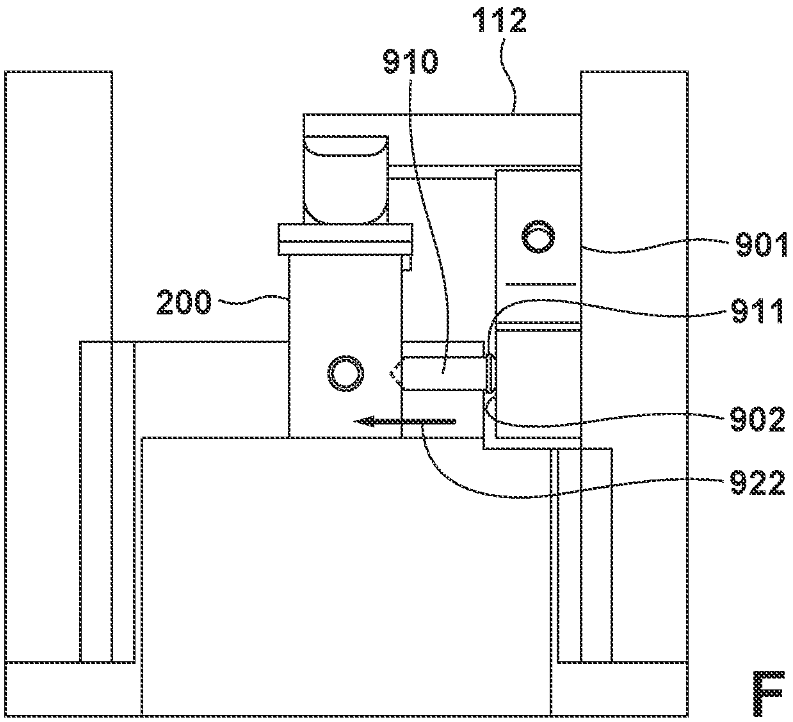
FIGS. 11A and 11B are diagrams for describing the movement of the capping arm and the pin for fixing a microtube according to the third embodiment.
Figure 11B:
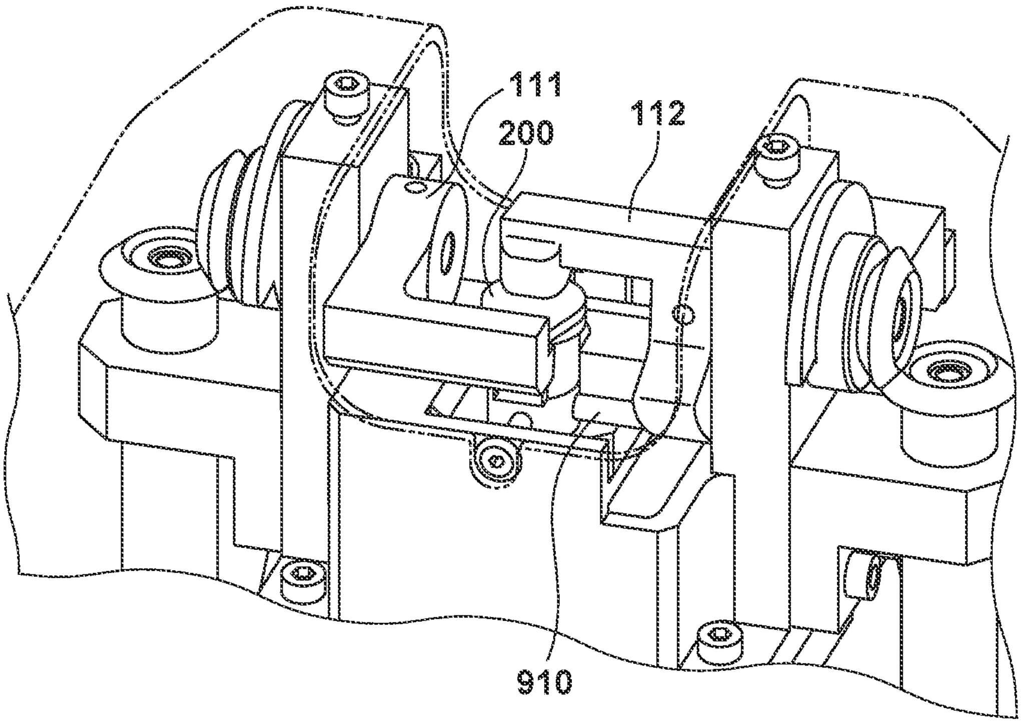

FIGS. 10A and 10B are diagrams for describing the state after the capping arm 112 is moved in the uncapping direction. The state at this time includes the surface of the second portion 904, the thin portion of the biasing member 901, and the flange 911 of the pin 910 being in contact or a gap being formed between the surface of the second portion 904 and the flange 911. In this state, the pin 910 can be moved to a position (non-pressed state) that does not affect the insertion or removal of the microtube 200 from the insertion hole 105. For example, the pin 910 can be drawn back to the position of the wall surface of the insertion hole 105 or even further back. Accordingly, even in a state in which the tip of the pin 910 is projecting past the wall surface of the insertion hole 105, the pin 910 is pushed in the direction of an arrow 921 by the insertion of the microtube 200 to a position that does not affect insertion and removal. FIGS. 11A and 11B are diagrams illustrating a state after the capping arm 112 is moved in the capping direction in which the first portion 902 of the biasing member 901 and the pin 910 are in contact. While the capping arm 112 is rotating to transition from the state illustrated in FIGS. 10A and 10B to the state illustrated in FIGS. 11A and 11B, the surface of contact between the pin 910 and the biasing member 901 changes from the second portion 904 to the inclined portion 903 and then to the first portion 902. By the inclined portion 903 being provided between the two portions, the pin 910 is gradually biased in the direction of an arrow 922 and transitions from the non-pressed state to the pressed state. In the state in which the pin 910 is in contact with the first portion 902, the pin 910 projects from the wall surface of the insertion hole 105 and presses against the side surface of the microtube 200. In this state, as described above, the side surface of the microtube 200 inserted into the insertion hole 105 is held by the pin 910 and the wall surface of the insertion hole 105, putting the microtube 200 in a fixed state in the insertion hole 105.

Note that during the rotation of the capping arm 112 in the transition from the state in FIGS. 10A and 10B to the state in FIGS. 11A and 11B, a force is needed to push the pin 910 at the inclined portion 903. However, since the flat first portion 902 is after the inclined surface, force that is more than necessary to push the pin 910 is not produced. Also, the force needed to rotate the capping arm 112 when capping includes the force for closing the cap 202 as well as the force for pushing the pin 910 in the direction of the arrow 922. However, the pushing force for the pin 910 is substantially orthogonal to the rotation direction of the capping arm 112, and thus is not a hindrance. Note that for the surface portion when the pin 910 (flange 911) and the biasing member 901 come into contact, a low-friction material is preferably used so that a large amount of friction force is not generated. Examples of a low-friction material include surface-treated materials treated by hard alumite treatment or Tufram treatment, Teflon (registered trademark), and the like.

As described in the first embodiment (FIG. 4), the position of the capping arm 112 illustrated in FIGS. 11A and 11B correspond to a state when starting uncapping (the state 2). Accordingly, when the uncapping operation is started from this state, the uncapping operation is performed with the microtube 200 in a state of being mechanical fixed by the pin 910. Thus, spilling and mixing of the sample or reagent when uncapping can be reduced. Note that the mechanism according to the third embodiment may naturally also be applied to the case of uncapping using the rotation control described in the second embodiment (FIG. 8).

In this manner, according to the third embodiment, vibrations caused at the microtube 200 when opening the cap 202 of the microtube 200 can be reduced.

Note that in the embodiments described above, a temperature adjusting mechanism that cools or adjusts the temperature of the surroundings of the microtube 200 inserted into the insertion hole 105. For example, a cooling mechanism, heater, or the like may be installed in the space indicated by hatching around the insertion hole 105 in FIG. 2D.

Also, in the embodiments described above, a configuration may be used in which a plurality of the arrangement portions of the microtube including the front support portion 103, the back support portion 104, and the insertion hole 105 are provided side by side in the direction of the rotation axis 106. In this case, for example, in the first and second embodiment, the uncapping arm 111 includes a plurality of the catch portions 115 at positions corresponding to the plurality of arrangement portions, and the capping arm 112 includes a plurality of the first protrusion portions 113 and the second protrusion portions 114 at positions corresponding to the plurality of arrangement portions. Alternatively, a configuration may be used in which the uncapping arm 111 includes the catch portion 115 that extends throughout the area in which the plurality of arrangement portions are arranged and the capping arm 112 includes the first protrusion portion 113 and the second protrusion portion 114 that extend throughout the area in which the plurality of arrangement portions are arranged. According to such a configuration, by one rotation operation of the uncapping arm 111 and the capping arm 112, uncapping or capping of the plurality of microtubes 200 disposed in the plurality of arrangement portions can be performed. Also, a configuration in which the side portions of the microtubes 200 placed in the arrangement portions are pressed by the corresponding biasing member 901 and the pin 910 may be added to the third embodiment. In this case, the shaft providing the rotation axis 106 of the capping arm 112 extends in the axial direction, and the plurality of biasing members 901 are provided corresponding to the plurality of arrangement portions. Accordingly, the position of the rotation axis 106 of the capping arm 112 needs to be a position that does not interfere with the microtubes placed in the arrangement portions.

Fourth Embodiment

Figure 13:
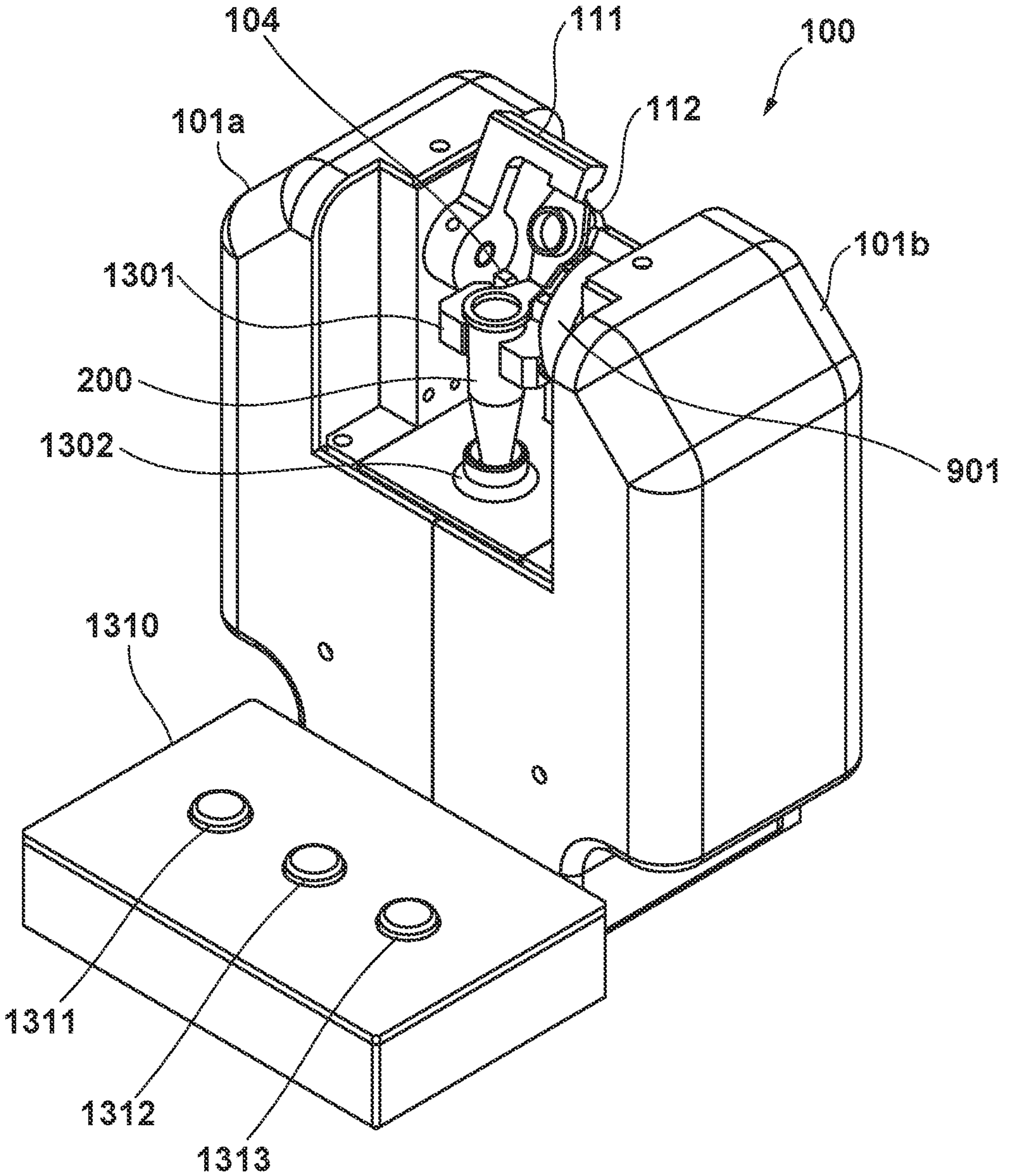
FIG. 13 is a general view of a cap opening and closing apparatus according to a fourth embodiment.

In the first and third embodiments, access to the microtube 200 is possible only from above the cap opening and closing apparatus 100. However, in order to improve the workability of the user with respect to the microtube 200 attached to the cap opening and closing apparatus 100, a structure with an open front as shown in FIG. 13 may be adopted. In FIG. 13, the same reference numerals are given to the structures similar to those of the third embodiment (FIGS. 9 to 12).

The outer covers 101*a* and 102*a* form a state in which a part of the front of the cap opening and closing apparatus 100 is opened. The microtube 200 mounted to the cap opening and closing apparatus 100 is held by an upper support member 1301 and a lower end support member 1302, and the cap 202 of the microtube 200 is opened and closed by the operation of the uncapping arm 111 and the capping arm 112 as described in the above embodiments. The upper support member 1301 has a back support portion 104 and supports the upper portion of the microphone tube 200. The lower end support member 1302 limits swinging of the lower end of the microtube 200 supported by the upper support member 1301. Thus, the microtube 200 is stably held by the upper support member 1301 and the lower end support member 1302. The lower end support member 1302 may be replaceable in case it becomes soiled or the like. Also, the lower end support member 1302 may be replaceable according to the shape of the lower end of the microtube 200 to be mounted. As in the third embodiment, the biasing member 901 biases the pin 910 to push the side surface of the microtube 200, thereby fixing the microtube 200 when the cap is opened. The pin 910 may be placed in an opening provided in the upper support member 1301. Note that a configuration in which the pin 910 is not provided as in the first embodiment is also possible.

By providing the front opening as described above, the user can see the contents of the microtube 200 mounted on the cap opening and closing apparatus 100. As a result, the user can recognize the positional relationship between a tip of a pipettor and a sample or reagent during fractionation/dispensing, thereby improving operability.

In FIG. 13, the operation unit 1310 has, for example, a stop button 1311, an uncapping button 1312, and a capping button 1313 as buttons used by the user to operate the cap opening and closing apparatus 100.

When the uncapping button 1312 is pressed, the uncapping arm 111 and the capping arm 112 start to perform the operations (uncapping operations) of states 1 to 3 shown in FIG. 4 or 8. When the capping button 1312 is pressed, the uncapping arm 111 and the capping arm 112 start to perform the operations (capping operations) of states 4 to 5 shown in FIG. 4 or 8. When the stop button 1311 is pushed, the uncapping arm 111 and the capping arm 112 in operation immediately stop.

Figure 14:
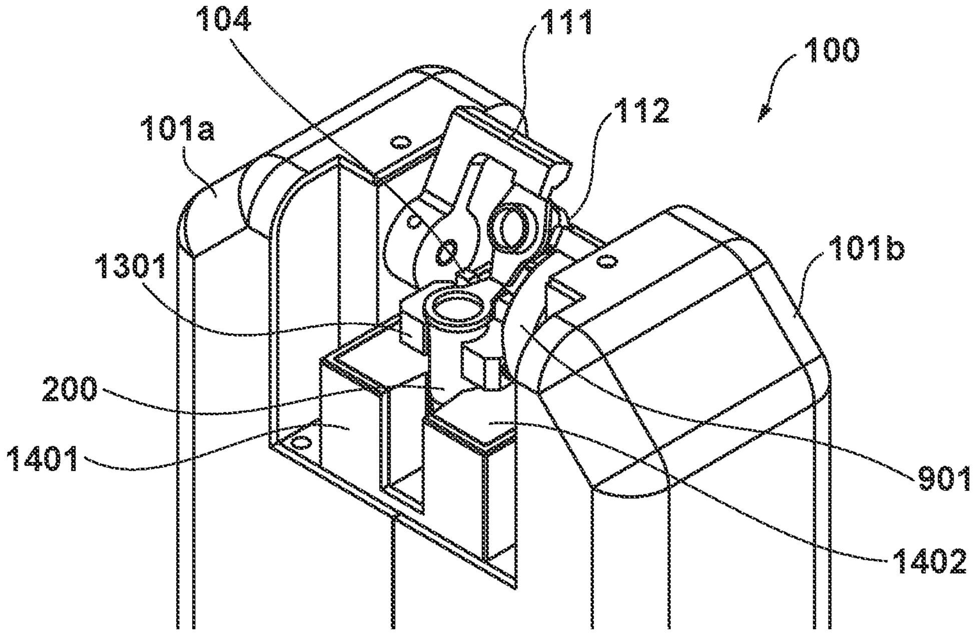
FIG. 14 is a view of another example of a cap opening and closing apparatus according to a fourth embodiment.

Moreover, as described in the third embodiment, a cooling mechanism, a heater, or the like may be attached to the front opening described above. FIG. 14 shows an example in which an cooling agent case 1401 containing a cooling agent 1402 is attached to the front opening of the cap opening and closing apparatus 100. For the cooling agent 1402, for example, a water absorbing polymer or a metal member such as aluminum can be used. The front face of the cooling agent case 1401 is open so that the user can observe the microtube 200 from the side. Note that the front opening of the cooling agent case 1401 may be a transparent panel. For example, the cooling agent case 1401 may be entirely made of a transparent panel, and the cooling agent 1402 may be accommodated as shown in FIG. 15, so that the microtube 200 can be observed by the user. The bottom surface of the cold insulator case 1401 is provided with a notch so as to avoid the lower end support member 1302. Alternatively, a support portion having the same function as the lower end support member 1302 may be provided on the bottom portion of the cooling agent case 1401 corresponding to the position of the lower end of the microtube 200 held by the upper support member 1301.

In this manner, according to the embodiments described above, caps of microtubes with various shapes can be more reliably opened.

The invention is not limited to the foregoing embodiments, and various variations/changes are possible within the spirit of the invention.

What is claimed is:

1. A cap opening and closing apparatus for opening and closing a cap of a microtube including a container body and the cap connected to the container body via a hinge portion, comprising:

a first arm that rotates about a first rotation axis, the first arm including a catch portion that moves, engages with an edge portion of the cap of the microtube placed at a predetermined position, and opens the cap as the first arm rotates in a first direction;

a second arm that rotates about a second rotation axis, the second arm including a pressing member that presses and closes the cap of the microtube placed at the predetermined position as the second arm rotates in a second direction opposite to the first direction;

a control unit that opens the cap by rotating the first arm and the second arm in the first direction with the cap positioned between the catch portion and the pressing members and during the opening rotation, a specific rotational position relationship is maintained in which an angle formed by a first straight line joining the first rotation axis and the catch portion and a second straight line joining the second rotation axis and the pressing member is within a predetermined angle range;

a pin that can slide to transition between a pressed state in which a side surface of the microtube placed at the predetermined position is pressed by a first end portion of the pin and a non-pressed state in which the side surface is not pressed; and a biasing member that rotates together with rotation of the second arm in the second direction and slides, according to the rotation, the pin to transition the pin into the pressed state: wherein the biasing member includes an inclined surface.

2. The cap opening and closing apparatus according to claim 1, wherein the predetermined angle range is in a range from 10° to 35°.

3. The cap opening and closing apparatus according to claim 1, wherein the control unit maintains the specific rotational position relationship by rotating the first arm and the second arm at an equal speed.

4. The cap opening and closing apparatus according to claim 1, wherein the control unit closes the cap by rotating the first arm and the second arm in the second direction with the cap positioned between the catch portion and the pressing member and the specific rotational position relationship maintained.

5. The cap opening and closing apparatus according to claim 1, wherein the control unit, when starting opening of the cap, controls a rotational position of the first arm and the second arm to bend the cap using the catch portion and the pressing member.

6. The cap opening and closing apparatus according to claim 5, wherein bending the cap causes a portion of the cap to separate from the container body.

7. The cap opening and closing apparatus according to claim 1, wherein a slide direction of the pin is a direction parallel with the second rotation axis.

8. The cap opening and closing apparatus according to claim 1, wherein the biasing member includes a first portion with a first thickness in a direction of the second rotation axis and a second portion with a second thickness thicker than the first portion, and according to rotation of the biasing member in the second direction, a state in which a second end portion of the pin on an opposite side to the first portion is in contact with the first portion transitions to a state in which the second end portion is in contact with the second portion to slide the pin to transition from the non-pressed state to the pressed state.

9. The cap opening and closing apparatus according to claim 8, wherein the inclined portion connects the first portion and the second portion so that thickness gradually changes from the first thickness to the second thickness.

10. The cap opening and closing apparatus according to claim 1, further comprising:

an insertion hole for inserting the container body for placing the microtube at the predetermined position.

11. The cap opening and closing apparatus according to claim 10, further comprising:

a support portion provided around the insertion hole that supports a rim portion provided at an opening portion of the container body of the microtube inserted into the insertion hole.

12. The cap opening and closing apparatus according to claim 11, wherein the support portion supports the rim portion at a position of the hinge portion of the microtube inserted into the insertion hole and a position opposite the position of the hinge portion.

13. The cap opening and closing apparatus according to claim 1, wherein the pressing member extends parallel with a direction intersecting the second rotation axis and includes a first protrusion portion for pressing a substantially central portion of the cap provided at an end portion on a side of the pressing member farther from the second rotation axis.

14. The cap opening and closing apparatus according to claim 13, wherein the pressing member includes a second protrusion portion lower than the first protrusion portion provided at an end portion on a side of the pressing member closer to the second rotation axis.

15. The cap opening and closing apparatus according to claim 1, wherein the first rotation axis and the second rotation axis are coaxial.

16. The cap opening and closing apparatus according to claim 1, wherein the first rotation axis and the second rotation axis are parallel with one another and disposed at or near one another.

17. A cap opening and closing method for opening and closing a cap of a microtube including a container body and the cap connected to the container body via a hinge portion, comprising:

opening the cap by rotating a first arm including a catch portion in a first direction centered at a first rotation axis and engaging an edge portion of the cap of the microtube placed at a predetermined position and the catch portion;

closing the cap by rotating a second arm including a pressing member in a second direction opposite the first direction centered at a second rotation axis and pressing the pressing member against the cap of the microtube placed at the predetermined positions; wherein in the opening, the first arm and the second arm are rotated in the first direction with the cap in a state positioned between the catch portion and the pressing members and during the opening rotation, a specific rotational position relationship is maintained in which an angle formed by a first straight line joining the first rotation axis and the catch portion and a second straight line joining the second rotation axis and the pressing member is within a predetermined angle ranges;

sliding a pin that can slide to transition between a pressed state in which a side surface of the microtube placed at the predetermined position is pressed by a first end portion of the pin and a non-pressed state in which the side surface is not pressed; and rotating a biasing member that rotates together with rotation of the second arm in the second direction and slides, according to the rotation, the pin to transition the pin into the pressed state wherein the biasing member includes an inclined surface.

* * * * *